(12) United States Patent
Akagawa et al.

(10) Patent No.: US 11,410,634 B2
(45) Date of Patent: Aug. 9, 2022

(54) INFORMATION PROCESSING APPARATUS, INFORMATION PROCESSING METHOD, DISPLAY SYSTEM, AND MOBILE OBJECT

(71) Applicant: SONY CORPORATION, Tokyo (JP)

(72) Inventors: Satoshi Akagawa, Tokyo (JP); Tomonari Murakami, Chiba (JP); Shoji Watanabe, Kanagawa (JP); Ayaka Satoh, Kanagawa (JP); Koji Nagata, Tokyo (JP); Nozomi Ichikawa, Kanagawa (JP); Masato Ohta, Chiba (JP); Yoshinori Nasada, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/770,406

(22) PCT Filed: Dec. 11, 2018

(86) PCT No.: PCT/JP2018/045441
§ 371 (c)(1),
(2) Date: Jun. 5, 2020

(87) PCT Pub. No.: WO2019/124158
PCT Pub. Date: Jun. 27, 2019

(65) Prior Publication Data
US 2020/0312282 A1    Oct. 1, 2020

(30) Foreign Application Priority Data

Dec. 19, 2017    (JP) .............................. JP2017-243118

(51) Int. Cl.
*G09G 5/38*    (2006.01)
*G06F 3/16*    (2006.01)
(Continued)

(52) U.S. Cl.
CPC ............... *G09G 5/38* (2013.01); *G06F 3/165* (2013.01); *G06V 40/10* (2022.01); *G09G 5/377* (2013.01)

(58) Field of Classification Search
CPC .......... G09G 5/38; G09G 5/377; G06F 3/165; G06K 9/00362
(Continued)

(56) References Cited

U.S. PATENT DOCUMENTS

2010/0253542 A1 * 10/2010 Seder .................... G01S 13/931
340/932.2
2011/0090409 A1    4/2011 Kawasaki et al.
(Continued)

FOREIGN PATENT DOCUMENTS

| CN | 104238923 A | 12/2014 |
| JP | 11-126153 A | 5/1999 |

(Continued)

OTHER PUBLICATIONS

International Search Report and Written Opinion of PCT Application No. PCT/JP2018/045441, dated Mar. 12, 2019, 09 pages of ISRWO.

*Primary Examiner* — Jin Ge
(74) *Attorney, Agent, or Firm* — Chip Law Group

(57) ABSTRACT

An information processing apparatus according to an embodiment of the present technology includes an acquisition unit and a display control unit. The acquisition unit acquires posture information regarding a posture of a user. The display control unit controls display locations of first information and second information on a display screen on the basis of the acquired posture information, the second information having a different kind from the first information, the display screen being disposed to cover a surrounding of the user at least from a front toward an upper side.

17 Claims, 14 Drawing Sheets

(51) Int. Cl.
*G09G 5/377* (2006.01)
*G06V 40/10* (2022.01)

(58) Field of Classification Search
USPC .......................................................... 345/634
See application file for complete search history.

(56) References Cited

U.S. PATENT DOCUMENTS

| | | | | |
|---|---|---|---|---|
| 2011/0260965 | A1* | 10/2011 | Kim | G06F 3/017 |
| | | | | 345/156 |
| 2012/0075464 | A1 | 3/2012 | Derenne et al. | |
| 2012/0224060 | A1* | 9/2012 | Gurevich | B60R 1/00 |
| | | | | 348/148 |
| 2012/0224062 | A1* | 9/2012 | Lacoste | G02B 27/01 |
| | | | | 348/148 |
| 2013/0194110 | A1* | 8/2013 | Kim | G06K 9/00671 |
| | | | | 340/905 |
| 2015/0061974 | A1* | 3/2015 | Kobayashi | G06F 3/14 |
| | | | | 345/8 |
| 2016/0035310 | A1 | 2/2016 | Song et al. | |
| 2016/0163108 | A1* | 6/2016 | Kim | G06F 3/013 |
| | | | | 345/633 |
| 2016/0291329 | A1* | 10/2016 | Kimura | G06F 3/0487 |
| 2018/0185763 | A1* | 7/2018 | Bear | A63F 13/428 |
| 2018/0210210 | A1* | 7/2018 | Yamamura | B60R 1/001 |
| 2018/0307378 | A1* | 10/2018 | Ishikawa | G02B 27/0093 |
| 2021/0116710 | A1* | 4/2021 | Masuya | G09G 5/38 |

FOREIGN PATENT DOCUMENTS

| | | |
|---|---|---|
| JP | 2007-164561 A | 6/2007 |
| JP | 2009-092950 A | 4/2009 |
| JP | 2011-090038 A | 5/2011 |
| JP | 2017-156366 A | 9/2017 |
| KR | 10-2016-0087654 A | 7/2016 |
| WO | 2012/040554 A2 | 3/2012 |
| WO | 2017/159063 A1 | 9/2017 |

* cited by examiner

INFORMATION PROCESSING APPARATUS, INFORMATION PROCESSING METHOD, DISPLAY SYSTEM, AND MOBILE OBJECT

CROSS REFERENCE TO RELATED APPLICATIONS

This application is a U.S. National Phase of International Patent Application No. PCT/JP2018/045441 filed on Dec. 11, 2018, which claims priority benefit of Japanese Patent Application No. JP 2017-243118 filed in the Japan Patent Office on Dec. 19, 2017. Each of the above-referenced applications is hereby incorporated herein by reference in its entirety.

TECHNICAL FIELD

The present technology relates to an information processing apparatus, an information processing method, a program, a display system, and a mobile object, which control display of images.

BACKGROUND ART

Patent Literature 1 describes a display system that selects a display location of video content in accordance with a posture of a user. In this display system, posture detection means for detecting a posture of a user is provided to furniture or the like including a reclining mechanism. On the basis of the posture of the user detected by the posture detection means, a display location at which video content is to be displayed is selected from a plurality of display locations. This allows the user to view the video content in an easy posture (paragraphs [0007], [0027], [0030], and [0032], FIG. 2, and the like in the specification of Patent Literature 1).

CITATION LIST

Patent Literature

Patent Literature 1: Japanese Patent Application Laid-open No. 2009-92950

DISCLOSURE OF INVENTION

Technical Problem

As described above, the technology of controlling display of information in accordance with a posture of a user or the like has been developed, and there is a demand for a technology capable of exerting high entertainment properties while improving the feeling of use of a user.

In view of the circumstances as described above, it is an object of the present technology to provide an information processing apparatus, an information processing method, a program, a display system, and a mobile object, which are capable of exerting high entertainment properties while improving the feeling of use of a user.

Solution to Problem

In order to achieve the object described above, an information processing apparatus according to an embodiment of the present technology includes an acquisition unit and a display control unit.

The acquisition unit acquires posture information regarding a posture of a user.

The display control unit controls display locations of first information and second information on a display screen on the basis of the acquired posture information, the second information having a different kind from the first information, the display screen being disposed to cover a surrounding of the user at least from a front toward an upper side.

In the information processing apparatus, the first information and the second information having a different kind from the first information are displayed on the display screen disposed so as to cover the surrounding of the user from the front toward the upper side. The display locations of the first information and the second information with different types are controlled on the basis of the posture information of the user. This makes it possible to exert high entertainment properties while improving the feeling of use of the user.

The first information may include at least one of video content selected by the user or a video of an outside.

This makes it possible to display video content, a video of the outside, or the like on the display screen and to provide various viewing experiences.

The second information may include at least one of notification information to the user, menu information, or exterior environment information.

This makes it possible to naturally present various types of information such as notification information, for example.

The display control unit may set a display location of the first information, with the center of a visual field of the user as a reference.

For example, displaying the first information at the center of the visual field of the user or the like makes it possible to provide a conformable viewing experience. As a result, the feeling of use of the user can be improved.

The display control unit may set a main display region in which the first information is to be displayed, with the center of the visual field of the user as a reference.

This makes it possible to properly display the first information in accordance with the visual field of the user and to sufficiently improve the feeling of use of the user.

The display control unit may set a display location of the second information, with the main display region as a reference.

This makes it possible to display the second information in accordance with the main display region in which the first information is to be displayed. As a result, the display of the second information can be easily controlled.

The display control unit may be capable of displaying the second information in a periphery of the main display region.

This makes it possible to properly display the second information without interrupting the first information and to present various types of information without hindering a viewing experience of the user.

The display control unit may be capable of displaying the second information in a manner superimposed on the main display region.

This makes it possible to easily present various types of information without hindering a viewing experience of the user.

The posture information may include at least one of a reclining angle of a seat to be used by the user or a user image obtained by capturing an image of the user.

This makes it possible to highly accurately detect the posture of the user or the like and to accurately control the display locations of the first and second information or the like.

The posture information may include visual field information regarding a visual field of the user, the visual field being detected on the basis of the user image.

This makes it possible to control in detail the display locations of the first and second information, for example, and to sufficiently improve the feeling of use of the user.

The display control unit may be capable of controlling display of third information having a different kind from each of the first information and the second information.

For example, displaying the third information makes it possible to exert high entertainment properties.

The display control unit may display the third information in a region, of the display screen, other than a main display region in which the first information is to be displayed.

This allows display using the display screen and makes it possible to provide a viewing experience with high entertainment properties.

The third information may include at least one of an extension image that extends a space represented by the first information displayed in the main display region or additional information regarding the first information.

This makes it possible to exert excellent entertainment properties.

The display control unit may be capable of controlling a display location of an operation image for the user to perform an operation input.

Displaying the operation image makes it possible to easily perform an operation input and to improve the feeling of use of the user.

The display control unit may set an operation region, in which the operation image is to be displayed around the user, on the basis of the posture information.

This makes it possible to display the operation image in a proper location and to sufficiently improve the feeling of use of the user.

The information processing apparatus may further include a sound control unit that controls a sound output direction on the basis of the posture information.

This makes it possible to provide a viewing experience with high entertainment properties.

An information processing method according to an embodiment of the present technology is an information processing method to be executed by a computer system and includes: acquiring posture information regarding a posture of a user; and controlling display locations of first information and second information on a display screen on the basis of the acquired posture information, the second information having a different kind from the first information, the display screen being disposed to cover a surrounding of the user at least from a front toward an upper side.

A program according to an embodiment of the present technology causes a computer system to execute the following steps of: acquiring posture information regarding a posture of a user; and controlling display locations of first information and second information on a display screen on the basis of the acquired posture information, the second information having a different kind from the first information, the display screen being disposed to cover a surrounding of the user at least from a front toward an upper side.

A display system according to an embodiment of the present technology includes a display apparatus, a display screen, an acquisition unit, and a display control unit.

The display screen is disposed to cover a surrounding of a user at least from a front toward an upper side.

The acquisition unit acquires posture information regarding a posture of the user.

The display control unit controls, on the basis of the acquired posture information, display locations of first information and second information having a different kind from the first information, the first information and the second information being to be displayed on the display screen by the display apparatus.

A mobile object according to an embodiment of the present technology is a mobile object capable of transferring a user and includes the display apparatus, the display screen, the acquisition unit, and the display control unit.

Advantageous Effects of Invention

As described above, according to the present technology, it is possible to exert high entertainment properties while improving the feeling of use of a user. Note that the effects described herein are not necessarily limited and any one of the effects described in this disclosure may be produced.

MODE(S) FOR CARRYING OUT THE INVENTION

Hereinafter, embodiments of the present technology will be described with reference to the drawings.

[Configuration of Vehicle]

Figure 1:
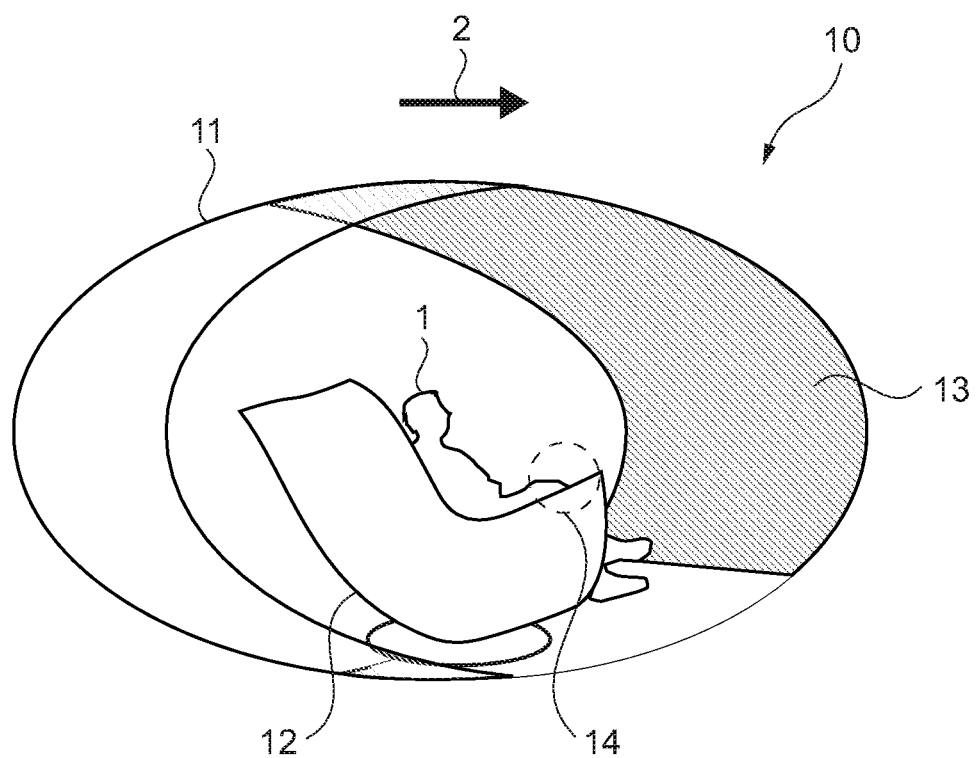
FIG. 1 is a schematic diagram illustrating an example of an internal space of a vehicle according to an embodiment of the present technology.

FIG. 1 is a schematic diagram illustrating an example of an internal space of a vehicle according to an embodiment of the present technology. A vehicle 10 includes a drivetrain system 108 (see FIG. 2) including a drive unit such as an engine, a motor, or the like (not illustrated) and is capable of moving with a user 1 riding on the vehicle 10. Further, the vehicle 10 has an autonomous driving function capable of automatically driving to a destination. Note that the vehicle 10 is an example of a mobile object according to this embodiment.

FIG. 1 schematically illustrates a traveling direction of the vehicle 10 with an arrow 2. The direction indicated by the arrow 2 (rightward direction in the figure) is the front of the vehicle 10, and the direction opposite to the direction indicated by the arrow 2 (leftward direction in the figure) is the rear of the vehicle 10. Further, an internal space 11 that is long in the front-back direction of the vehicle 10 is provided inside of the vehicle 10. The internal space 11 has a shape curved to the front side and the rear side of the vehicle 10. Note that the illustration of the side surfaces of the internal space 11 is omitted in FIG. 1.

The internal space 11 of the vehicle 10 includes a passenger seat 12 and a display target surface 13. The passenger seat 12 is installed on the bottom surface of the internal space 11 to face the front of the vehicle 10. Therefore, the user 1 riding on the vehicle 10 is to be seated on the passenger seat 12 while facing to the front of the vehicle 10. Further, the passenger seat 12 has a reclining mechanism that is not illustrated. In this embodiment, the passenger seat 12 corresponds to a seat to be used by the user 1.

The reclining mechanism can adjust a reclining angle including an angle of the backrest of the passenger seat 12 and the like. The adjusted reclining angle is detected by, for example, an angle detection sensor. Note that the number, types, or the like of reclining angles adjustable by the reclining mechanism is not limited. For example, an angle of a headrest, a seat surface, a footrest (illustration omitted), or the like of the passenger seat 12 may be appropriately adjustable. Using the reclining mechanism allows the user 1 to ride on the vehicle 10 in an easy posture, for example.

The display target surface 13 is disposed so as to cover the surrounding of the user 1 at least from the front toward the upper side. In the example illustrated in FIG. 1, the display target surface 13 is disposed from the front to the upper side of the passenger seat 12 (user 1) along a wall surface of the internal space 11 of the vehicle 10. Hereinafter, a direction from the lower end side of the display target surface 13 (bottom surface side of internal space 11) toward the upper end side along the shape of the display target surface 13 will be described as a vertical direction of the display target surface 13. Further, a direction on the display target surface 13 that is perpendicular to the vertical direction will be described as a horizontal direction of the display target surface. In this embodiment, the display target surface 13 corresponds to a display screen.

In this disclosure, "the display screen disposed so as to cover the surrounding of the user at least from the front toward the upper side" is, for example, a surface (display target surface 13) disposed at least from the front over the head of the user 1 being in a seated posture or a surface (display target surface 13) disposed at least from the windshield to the center pillars (B pillars) of the vehicle 10. Therefore, the display target surface 13 covers a region that is at least the front of the user 1 (windshield and the like) toward a region that is the upper side of the user 1 (upper surface side of internal space 11 and the like). For example, even in a case where the reclining angle of the backrest of the passenger seat 12 is adjusted and the posture of the user 1 (angle of waist or the like) is changed, the user 1 can easily view the display target surface 13. In other words, it can also be said that the display target surface 13 is disposed to properly fall within the visual field of the user 1 irrespective of the change in posture of the user 1. The shape, size, or the like of the display target surface 13 is not limited.

Various types of information containing video content, a notification to the user 1, and the like are displayed on the display target surface 13. Therefore, the user 1 can view the various types of information displayed on the display target surface 13 while riding on the vehicle 10. The configuration for displaying video content and the like will be described later in detail using FIG. 3 and the like.

Further, the internal space 11 of the vehicle 10 includes an operation input unit and a sound system that are not illustrated.

The operation input unit displays an operation image for the user 1 to perform an operation input. Further, the operation input unit detects an operation input of the user 1 using the operation image. Examples of the operation input unit include a projector including a sensing camera. In other words, an operation image is projected by the projector, and an operation of the user 1 with respect to the operation image is detected by the sensing camera. The operation input unit is appropriately installed, for example, on the side surface of the internal space 11 or in the vicinity of the passenger seat 12. The configuration of the operation input unit, a location to be installed, and the like are not limited.

FIG. 1 schematically illustrates an operation region 14, in which the operation image is to be displayed, by a dotted line. In the example of FIG. 1, the operation region 14 is provided around the armrest of the passenger seat 12. The user 1 can perform a predetermined operation input in accordance with an operation image displayed near the hand or the like. Note that the region in which the operation image is to be displayed (operation region 14) can be appropriately changed. This will be described later.

The sound system includes a plurality of speakers. The plurality of speakers is appropriately disposed so as to be capable of three-dimensionally reproducing sound or the like in the internal space 11, for example. This allows expression of a direction from which sound is coming, a distance, or the like. Further, in this embodiment, a sound system using the reflection of sound waves or the like by the display target surface 13 is configured. This allows such production as outputting sound or the like toward the front of the user 1, for example, and makes it possible to achieve a sound environment of realistic sensation.

Besides, a camera that captures an image of the user 1, a biological sensor that detects biological information of the user 1, and the like are appropriately provided in the internal space 11 of the vehicle 10. Equipment provided in the internal space 11 of the vehicle 10 and the like are not limited. For example, an input device of an input unit 101, sensors of a data acquisition unit 102, which will be described later, and the like may be appropriately disposed in the internal space 11 of the vehicle 10.

[Configuration of Vehicle Control System]

Figure 2:
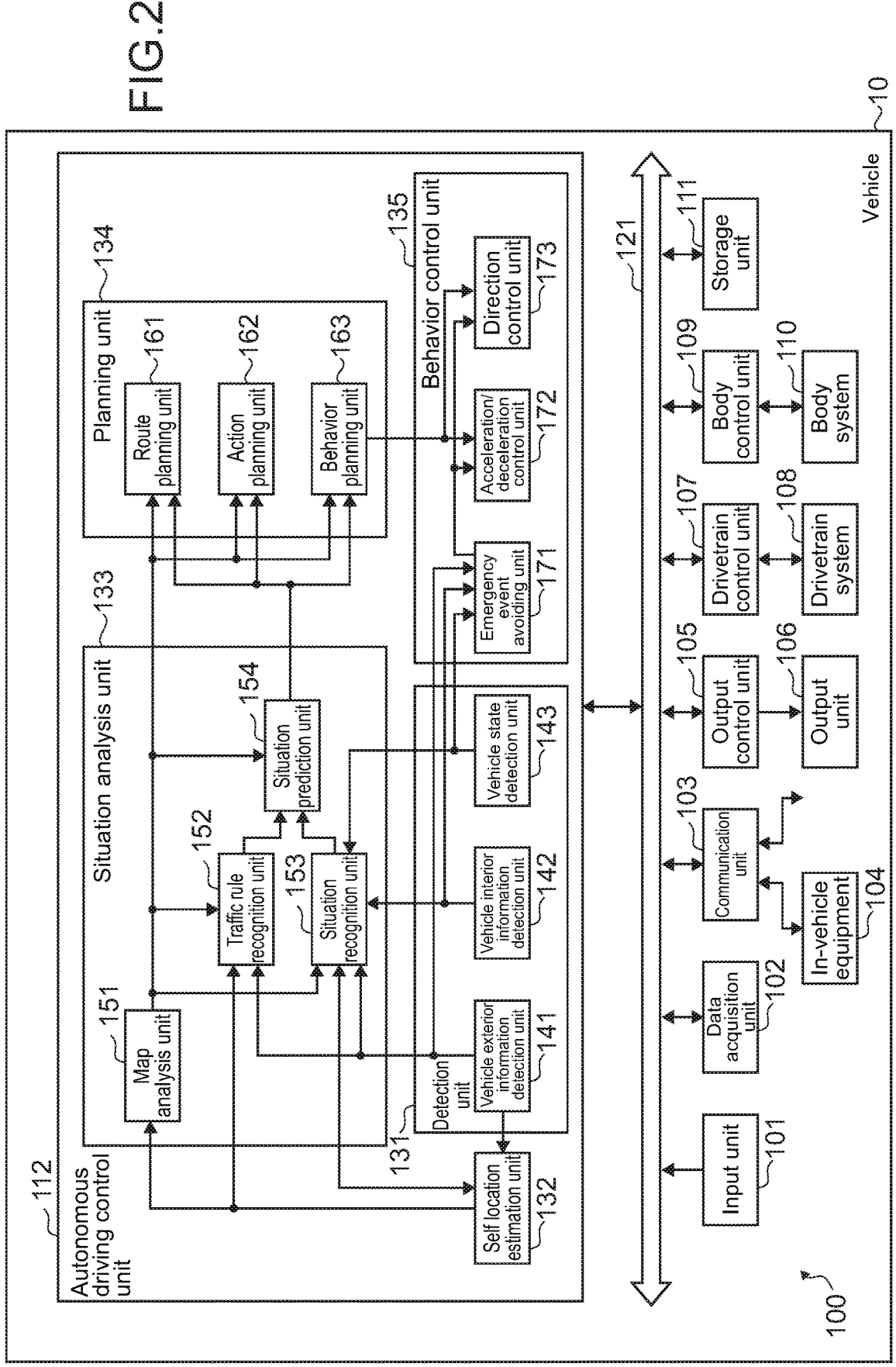
FIG. 2 is a block diagram illustrating a configuration example of a vehicle control system that controls the vehicle.

FIG. 2 is a block diagram illustrating a configuration example of a vehicle control system 100 that controls the vehicle 10. The vehicle control system 100 is a system that is installed in the vehicle 10 and that controls the vehicle 10 in various ways. Note that, hereinafter, the vehicle 10 is referred to as an own car or an own vehicle in the case of distinguishing the vehicle 10 from other vehicles.

The vehicle control system 100 includes the input unit 101, the data acquisition unit 102, a communication unit 103, in-vehicle equipment 104, an output control unit 105, an output unit 106, a drivetrain control unit 107, a drivetrain system 108, a body control unit 109, a body system 110, a storage unit 111, and an autonomous driving control unit 112. The input unit 101, the data acquisition unit 102, the communication unit 103, the output control unit 105, the drivetrain control unit 107, the body control unit 109, the storage unit 111, and the autonomous driving control unit 112 are connected to each other via a communication network 121. For example, the communication network 121 includes a bus or a vehicle-mounted communication network compliant with any standard such as a controller area network (CAN), a local interconnect network (LIN), a local area network (LAN), FlexRay (registered trademark), or the like. Note that sometimes the units of the vehicle control system 100 may be directly connected to each other without using the communication network 121.

Note that, hereinafter, description of the communication network 121 will be omitted in the case where the units of the vehicle control system 100 communicate with each other via the communication network 121. For example, simple description indicating that the input unit 101 and the autonomous driving control unit 112 communicate with each other will be given, in the case where the input unit 101 and the autonomous driving control unit 112 communicate with each other via the communication network 121.

The input unit 101 includes an apparatus used by a passenger to input various kinds of data, instructions, or the like. For example, the input unit 101 includes an operation device such as a touchscreen, a button, a microphone, a switch, or a lever, an operation device capable of inputting information by sound, gesture, or the like that is different from manual operation, or the like. Alternatively, for example, the input unit 101 may be external connection equipment such as a remote control apparatus using infrared or another radio wave, or mobile equipment or wearable equipment compatible with operation of the vehicle control system 100. The input unit 101 generates an input signal on the basis of data, an instruction, or the like input by a passenger, and supplies the generated input signal to the respective units of the vehicle control system 100.

The data acquisition unit 102 includes various kinds of sensors or the like for acquiring data to be used in processes performed by the vehicle control system 100, and supplies the acquired data to the respective units of the vehicle control system 100.

For example, the data acquisition unit 102 includes various kinds of sensors for detecting a state or the like of the vehicle 10. Specifically, for example, the data acquisition unit 102 includes a gyro sensor, an acceleration sensor, an inertial measurement unit (IMU), and sensors or the like for detecting an amount of operation of an accelerator pedal, an amount of operation of a brake pedal, an steering angle of a steering wheel, the number of revolutions of an engine, the number of revolutions of a motor, rotational speeds of wheels, and the like.

Further, for example, the data acquisition unit 102 includes various kinds of sensors for detecting information regarding the outside of the vehicle 10. Specifically, for example, the data acquisition unit 102 includes an imaging apparatus (vehicle exterior camera) such as a time-of-flight (ToF) camera, a stereo camera, a monocular camera, an infrared camera, or another camera. Further, for example, the data acquisition unit 102 includes an environment sensor for detecting weather, a meteorological phenomenon, or the like, and a surrounding information detection sensor for detecting objects around the vehicle 10. For example, the environment sensor includes a raindrop sensor, a fog sensor, a sunshine sensor, a snow sensor, or the like. The surrounding information detection sensor includes an ultrasonic sensor, a radar, a LiDAR (Light Detection and Ranging, Laser Imaging Detection and Ranging) sensor, a sonar, or the like.

Furthermore, for example, the data acquisition unit 102 includes various kinds of sensors for detecting a current location of the vehicle 10. Specifically, for example, the data acquisition unit 102 includes a global navigation satellite system (GNSS) receiver or the like. The GNSS receiver receives satellite signals (hereinafter, referred to as GNSS signals) from a GNSS satellite serving as a navigation satellite.

Further, for example, the data acquisition unit 102 includes various kinds of sensors for detecting information regarding the inside of the vehicle 10. Specifically, for example, the data acquisition unit 102 includes an imaging apparatus (vehicle interior camera) that captures an image of a driver, a biological sensor that detects biological information of the driver, a microphone that collects sound within the interior of the vehicle, or the like. The biological sensor is, for example, disposed on a seat surface, the steering wheel, or the like, and detects biological information of a passenger sitting in a seat or the driver holding the steering wheel.

The communication unit 103 communicates with the in-vehicle equipment 104, various kinds of vehicle exterior equipment, a server, a base station, or the like, transmits data supplied by the respective units of the vehicle control system 100, and supplies the received data to the respective units of the vehicle control system 100. Note that a communication protocol supported by the communication unit 103 is not specifically limited. It is possible for the communication unit 103 to support a plurality of types of communication protocols.

For example, the communication unit 103 establishes wireless connection with the in-vehicle equipment 104 by using a wireless LAN, Bluetooth (registered trademark), near-field communication (NFC), wireless USB (WUSB), or the like. Further, for example, the communication unit 103 establishes wired connection with the in-vehicle equipment 104 by using Universal Serial Bus (USB), High-Definition Multimedia Interface (HDMI), Mobile High-Definition Link (MHL), or the like via a connection terminal (and a cable if necessary) (not illustrated).

Furthermore, for example, the communication unit 103 communicates with equipment (for example, an application server or a control server) present on an external network (for example, the Internet, a cloud network, or a company-specific network) via a base station or an access point. Further, for example, the communication unit 103 communicates with a terminal (for example, a terminal of a pedestrian or a store, or a machine-type communication (MTC) terminal) present in the vicinity of the vehicle 10 by using a peer-to-peer (P2P) technology. Furthermore, for example, the communication unit 103 carries out V2X communication such as vehicle-to-vehicle communication, vehicle-to-infrastructure communication, vehicle-to-home communication between the vehicle 10 and a home, or vehicle-to-pedestrian communication.

Further, for example, the communication unit 103 includes a beacon receiver, receives a radio wave or an electromagnetic wave transmitted from a radio station installed on a road or the like, and acquires information regarding the current location, traffic congestion, traffic regulation, necessary time, or the like.

The in-vehicle equipment 104 includes mobile equipment or wearable equipment possessed by a passenger, information equipment carried into or attached to the vehicle 10, a navigation apparatus that searches for a route to any destination, and the like, for example.

The output control unit 105 controls output of various kinds of information to the passenger of the vehicle 10 or to an outside of the vehicle 10. For example, the output control unit 105 generates an output signal that includes at least one of visual information (such as image data) or audio information (such as sound data), supplies the output signal to the output unit 106, and thereby controls output of the visual information and the audio information from the output unit 106. Specifically, for example, the output control unit 105 combines pieces of image data captured by different imaging apparatuses included in the data acquisition unit 102, generates a bird's-eye image, a panoramic image, or the like, and supplies an output signal including the generated image to the output unit 106. Further, for example, the output control unit 105 generates sound data including warning sound, a warning message, or the like with regard to danger such as collision, contact, or entrance into a danger zone, and supplies an output signal including the generated sound data to the output unit 106.

The output control unit 105 corresponds to an information processing apparatus according to this embodiment and includes hardware necessary for a computer, such as a central processing unit (CPU), a random access memory (RAM), and a read only memory (ROM), for example. The CPU loads a program according to the present technology, which is stored in advance in the ROM, to the RAM and executes the program, and thus an information processing method according to the present technology is executed.

A specific configuration of the output control unit 105 is not limited. For example, devices including a programmable logic device (PLD) such as a field programmable gate array (FPGA), an application specific integrated circuit (ASIC), and the like may be used. The output control unit 105 will be described later in detail with reference to FIG. 3 and the like.

The output unit 106 includes an apparatus capable of outputting the visual information or the audio information to the passenger or the outside of the vehicle 10. For example, the output unit 106 includes a display apparatus, an instrument panel, a sound system such as an audio speaker, headphones, a wearable device such as an eyeglass type display worn by the passenger or the like, a projector, a lamp, or the like. Note that the display apparatus included in the output unit 106 functions as a display mechanism for displaying various types of information on the display target surface 13 in FIG. 1.

The drivetrain control unit 107 generates various kinds of control signals, supplies them to the drivetrain system 108, and thereby controls the drivetrain system 108. Further, as necessary, the drivetrain control unit 107 supplies the control signals to structural elements other than the drivetrain system 108 and notifies them of a control state of the drivetrain system 108 or the like.

The drivetrain system 108 includes various kinds of apparatuses related to the drivetrain of the vehicle 10. For example, the drivetrain system 108 includes a driving force generation apparatus for generating driving force of an internal combustion engine, a driving motor, or the like, a driving force transmitting mechanism for transmitting the driving force to wheels, a steering mechanism for adjusting the steering angle, a braking apparatus for generating braking force, an anti-lock braking system (ABS), an electronic stability control (ESC) system, an electric power steering apparatus, or the like.

The body control unit 109 generates various kinds of control signals, supplies them to the body system 110, and thereby controls the body system 110. Further, as necessary, the body control unit 109 supplies the control signals to structural elements other than the body system 110 and notifies them of a control state of the body system 110 or the like.

The body system 110 includes various kinds of body apparatuses provided to a vehicle body. For example, the body system 110 includes a keyless entry system, a smart key system, a power window apparatus, a power seat, the steering wheel, an air conditioner, various kinds of lamps (such as headlamps, tail lamps, brake lamps, direction-indicator lamps, and fog lamps), and the like.

The storage unit 111 includes read only memory (ROM), random access memory (RAM), a magnetic storage device such as a hard disc drive (HDD) or the like, a semiconductor storage device, an optical storage device, a magneto-optical storage device, or the like, for example. The storage unit 111 stores various kinds of programs, data, and the like used by respective units of the vehicle control system 100. For example, the storage unit 111 stores map data such as a three-dimensional high-accuracy map, a global map, and a local map. The high-accuracy map is a dynamic map or the like. The global map has lower accuracy than the high-accuracy map but covers wider area than the high-accuracy map. The local map includes information regarding surroundings of the vehicle 10.

The autonomous driving control unit 112 performs control with regard to autonomous driving such as autonomous travel or driving assistance. Specifically, for example, the autonomous driving control unit 112 performs cooperative control intended to implement functions of an advanced driver-assistance system (ADAS) which include collision avoidance or shock mitigation for the vehicle 10, following driving based on a following distance, vehicle speed maintaining driving, a warning of collision of the vehicle 10, a warning of deviation of the vehicle 10 from a lane, or the like. Further, for example, it is also possible for the autonomous driving control unit 112 to perform cooperative control intended for autonomous driving that makes the vehicle travel autonomously without depending on the operation of the driver or the like. The autonomous driving control unit 112 includes a detection unit 131, a self location estimation unit 132, a situation analysis unit 133, a planning unit 134, and a behavior control unit 135.

The detection unit 131 detects various kinds of information necessary to control autonomous driving. The detection unit 131 includes a vehicle exterior information detection unit 141, a vehicle interior information detection unit 142, and a vehicle state detection unit 143.

The vehicle exterior information detection unit 141 performs a process of detecting information regarding an outside of the vehicle 10 on the basis of data or signals from the respective units of the vehicle control system 100. For example, the vehicle exterior information detection unit 141 performs a detection process, a recognition process, a tracking process of objects around the vehicle 10, and a process of detecting distances to the objects. Examples of the detection target object include a vehicle, a person, an obstacle, a structure, a road, a traffic light, a traffic sign, a road sign, and the like. Further, for example, the vehicle exterior information detection unit 141 performs a process of detecting an ambient environment around the vehicle 10. Examples of the ambient environment around the detection target include weather, temperature, humidity, brightness, a road surface condition, and the like, for example. The vehicle exterior information detection unit 141 supplies data indicating results of the detection processes to the self location estimation unit 132, a map analysis unit 151, a traffic rule recognition unit 152, and a situation recognition unit 153 of the situation analysis unit 133, an emergency event avoiding unit 171 of the behavior control unit 135, and the like.

The vehicle interior information detection unit 142 performs a process of detecting information regarding an inside of the vehicle on the basis of data or signals from the respective units of the vehicle control system 100. For example, the vehicle interior information detection unit 142 performs an authentication process and a recognition process of the driver, a detection process of a state of the driver, a detection process of a passenger, a detection process of a vehicle interior environment, and the like. Examples of the state of the driver, which is a detection target, include a health condition, a degree of consciousness, a degree of concentration, a degree of fatigue, a gaze direction, and the like. Examples of the vehicle interior environment, which is a detection target, include temperature, humidity, brightness, smell, and the like. The vehicle interior information detection unit 142 supplies data indicating results of the detection processes to the situation recognition unit 153 of the situation analysis unit 133, the emergency event avoiding unit 171 of the behavior control unit 135, and the like.

The vehicle state detection unit 143 performs a process of detecting a state of the vehicle 10 on the basis of data or signals from the respective units of the vehicle control system 100. Examples of the state of the vehicle 10, which is a detection target, includes speed, acceleration, a steering angle, presence/absence of abnormality, a content of the abnormality, a driving operation state, a position and inclination of the power seat (passenger seat 12), a state of a door lock, states of other vehicle-mounted equipment, and the like. The vehicle state detection unit 143 supplies data indicating results of the detection processes to the situation recognition unit 153 of the situation analysis unit 133, the emergency event avoiding unit 171 of the behavior control unit 135, and the like.

The self location estimation unit 132 performs a process of estimating a location, a posture, and the like of the vehicle 10 on the basis of data or signals from the respective units of the vehicle control system 100 such as the vehicle exterior information detection unit 141 and the situation recognition unit 153 of the situation analysis unit 133. Further, as necessary, the self location estimation unit 132 generates a local map (hereinafter, referred to as a self location estimation map) to be used for estimating a self location. For example, the self location estimation map may be a high-accuracy map using a technology such as simultaneous localization and mapping (SLAM). The self location estimation unit 132 supplies data indicating a result of the estimation process to the map analysis unit 151, the traffic rule recognition unit 152, and the situation recognition unit 153 of the situation analysis unit 133, and the like. Further, the self location estimation unit 132 causes the storage unit 111 to store the self location estimation map.

The situation analysis unit 133 performs a process of analyzing a situation of the vehicle 10 and a situation around the vehicle 10. The situation analysis unit 133 includes the map analysis unit 151, the traffic rule recognition unit 152, the situation recognition unit 153, and a situation prediction unit 154.

The map analysis unit 151 performs a process of analyzing various kinds of maps stored in the storage unit 111 and constructs a map including information necessary for an autonomous driving process while using data or signals from the respective units of the vehicle control system 100 such as the self location estimation unit 132 and the vehicle exterior information detection unit 141 as necessary. The map analysis unit 151 supplies the constructed map to the traffic rule recognition unit 152, the situation recognition unit 153, and the situation prediction unit 154, and to a route planning unit 161, an action planning unit 162, a behavior planning unit 163 of the planning unit 134, and the like.

The traffic rule recognition unit 152 performs a process of recognizing traffic rules around the vehicle 10 on the basis of data or signals from the respective units of the vehicle control system 100 such as the self location estimation unit 132, the vehicle exterior information detection unit 141, and the map analysis unit 151. The recognition process makes it possible to recognize locations and states of traffic lights around the vehicle 10, contents of traffic control around the vehicle 10, a drivable lane, and the like, for example. The traffic rule recognition unit 152 supplies data indicating a result of the recognition process to the situation prediction unit 154 and the like.

The situation recognition unit 153 performs a process of recognizing situations related to the vehicle 10 on the basis of data or signals from the respective units of the vehicle control system 100 such as the self location estimation unit 132, the vehicle exterior information detection unit 141, the vehicle interior information detection unit 142, the vehicle condition detection unit 143, and the map analysis unit 151. For example, the situation recognition unit 153 performs a process of recognizing a situation of the vehicle 10, a situation around the vehicle 10, a situation of the driver of the vehicle 10, and the like. Further, as necessary, the situation recognition unit 153 generates a local map (hereinafter, referred to as a situation recognition map) to be used for recognizing the situation around the vehicle 10. For example, the situation recognition map may be an occupancy grid map.

Examples of the situation of the vehicle 10, which is a recognition target, include a location, a posture, and movement (such as speed, acceleration, or a movement direction, for example) of the vehicle 10, presence/absence of abnormality, contents of the abnormality, and the like. Examples of the situation around the vehicle 10, which is a recognition target, include types and locations of surrounding still objects, types, locations, and movement (such as speed, acceleration, and movement directions, for example) of surrounding moving objects, structures of surrounding roads, conditions of road surfaces, ambient weather, temperature, humidity, brightness, and the like. Examples of the state of the driver, which is a recognition target, include a health condition, a degree of consciousness, a degree of concentration, a degree of fatigue, movement of gaze, driving operation, and the like.

The situation recognition unit 153 supplies data indicating a result of the recognition process (including the situation recognition map as necessary) to the self location estimation unit 132, the situation prediction unit 154, and the like. Further, the situation recognition unit 153 causes the storage unit 111 to store the situation recognition map.

The situation prediction unit 154 performs a process of predicting a situation related to the vehicle 10 on the basis of data or signals from the respective units of the vehicle control system 100 such as the map analysis unit 151, the traffic rule recognition unit 152, and the situation recognition unit 153. For example, the situation prediction unit 154 performs a process of predicting a situation of the vehicle 10, a situation around the vehicle 10, a situation of the driver, and the like.

Examples of the situation of the vehicle 10, which is a prediction target, includes behavior of the vehicle, occurrence of abnormality, a drivable distance, and the like. Examples of the situation around the vehicle 10, which is a prediction target, includes behavior of moving objects, change in states of traffic lights, change in environments such as weather, and the like around the vehicle 10. Examples of the situation of the driver, which is a prediction target, include behavior, a health condition, and the like of the driver.

The situation prediction unit 154 supplies data indicating results of the prediction processes to the route planning unit 161, the action planning unit 162, and the behavior planning unit 163 of the planning unit 134 and the like in addition to the data from the traffic rule recognition unit 152 and the situation recognition unit 153.

The route planning unit 161 plans a route to a destination on the basis of data or signals from the respective units of the vehicle control system 100 such as the map analysis unit 151 and the situation prediction unit 154. For example, the route planning unit 161 sets a route from the current location to a specified destination on the basis of the global map. Further, for example, the route planning unit 161 appropriately changes the route on the basis of situations such as traffic congestion, accidents, traffic regulation, and constructions, and a health condition and the like of the driver. The route planning unit 161 supplies data indicating the planned route to the action planning unit 162 and the like.

The action planning unit 162 plans an action of the vehicle 10 for driving safely in the route planned by the route planning unit 161 within a planned time period, on the basis of data or signals from the respective units of the vehicle control system 100 such as the map analysis unit 151 and the situation prediction unit 154. For example, the action planning unit 162 plans start, stop, a driving direction (for example, forward, backward, left turn, right turn, change of direction, etc.), a driving lane, driving speed, overtaking, and the like. The action planning unit 162 supplies data indicating the action planned for the vehicle 10 to the behavior planning unit 163 and the like.

The behavior planning unit 163 plans behavior of the vehicle 10 for achieving the action planned by the action planning unit 162 on the basis of data or signals from the respective units of the vehicle control system 100 such as the map analysis unit 151 and the situation prediction unit 154. For example, the behavior planning unit 163 plans acceleration, deceleration, a driving course, and the like. The behavior planning unit 163 supplies data indicating the planed behavior of the vehicle 10 to an acceleration/deceleration control unit 172, a direction control unit 173, and the like of the behavior control unit 135.

The behavior control unit 135 controls behavior of the vehicle 10. The behavior control unit 135 includes the emergency event avoiding unit 171, the acceleration/deceleration control unit 172, and the direction control unit 173.

The emergency event avoiding unit 171 performs a process of detecting collision, contact, entrance into a danger zone, or an emergency event such as abnormality in the driver or abnormality in the vehicle 10 on the basis of detection results obtained by the vehicle exterior information detection unit 141, the vehicle interior information detection unit 142, and the vehicle state detection unit 143. In the case where occurrence of an emergency event is detected, the emergency event avoiding unit 171 plans behavior of the vehicle 10 such as a quick stop or a quick turn for avoiding the emergency event. The emergency event avoiding unit 171 supplies data indicating the planned behavior of the vehicle 10 to the acceleration/deceleration control unit 172, the direction control unit 173, and the like.

The acceleration/deceleration control unit 172 controls acceleration/deceleration to achieve the behavior of the vehicle 10 planned by the behavior planning unit 163 or the emergency event avoiding unit 171. For example, the acceleration/deceleration control unit 172 computes a control goal value of the driving force generation apparatus or the braking apparatus to achieve the planned acceleration, deceleration, or quick stop, and supplies a control instruction indicating the computed control goal value to the drivetrain control unit 107.

The direction control unit 173 controls a direction to achieve the behavior of the vehicle 10 planned by the behavior planning unit 163 or the emergency event avoiding unit 171. For example, the direction control unit 173 computes a control goal value of the steering mechanism to achieve a driving course or quick turn planned by the behavior planning unit 163 or the emergency event avoiding unit 171, and supplies a control instruction indicating the computed control goal value to the drivetrain control unit 107.

[Configuration of Output Control Unit]

Figure 3:
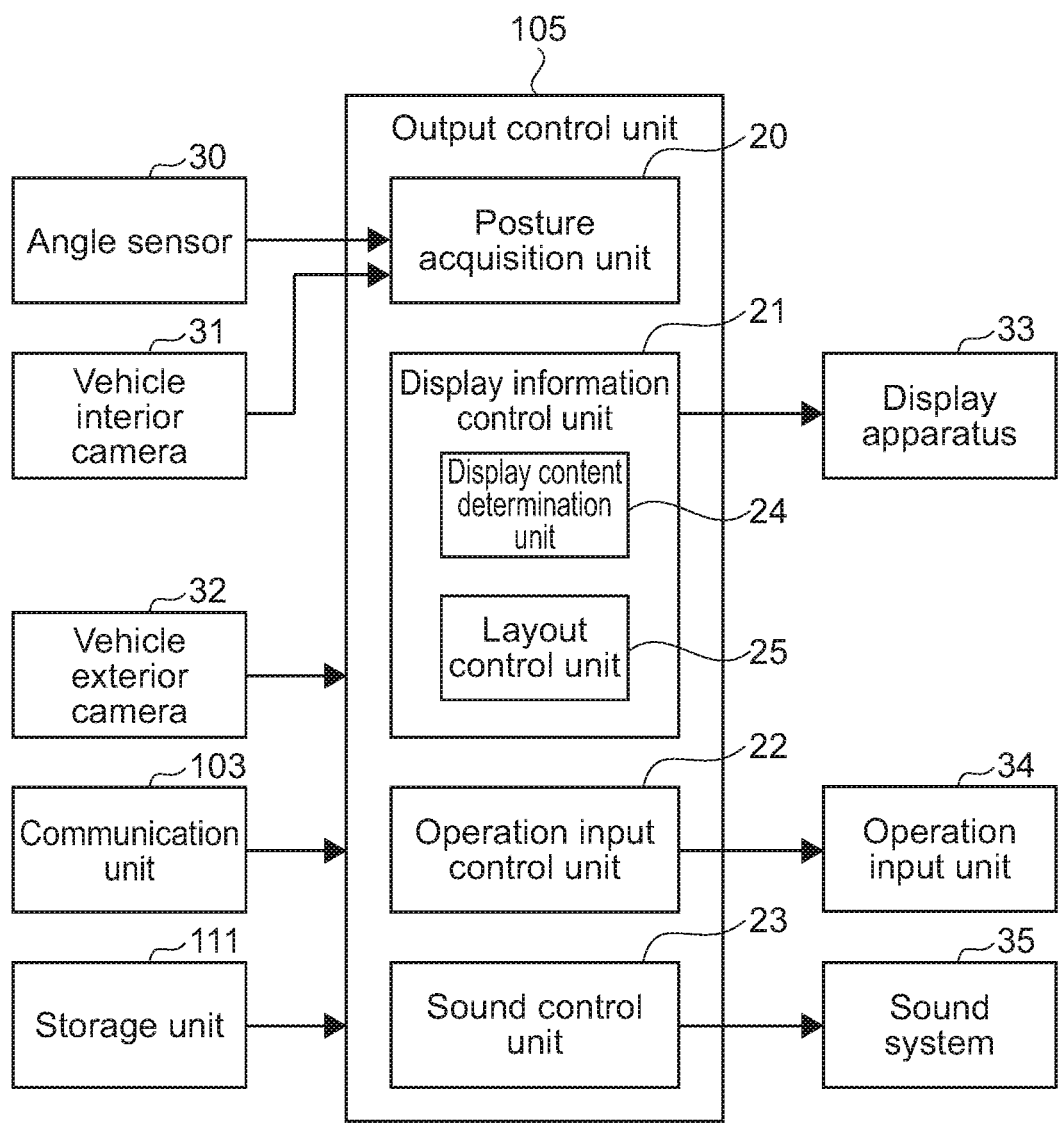
FIG. 3 is a block diagram illustrating a configuration example of an output control unit in FIG. 2.

FIG. 3 is a block diagram illustrating a configuration example of the output control unit 105 in FIG. 2. The output control unit 105 includes a posture acquisition unit 20, a display information control unit 21, an operation input control unit 22, and a sound control unit 23. For example, when the CPU of the output control unit 105 executes a predetermined program, each functional block is configured.

The posture acquisition unit 20 acquires posture information regarding the posture of the user 1. As described above, the user 1 seated on the passenger seat 12 can adjust the user's posture by using the reclining mechanism or the like (see FIG. 1). Information regarding an angle of the upper body of the user 1 with respect to the seat surface at that time, the orientation of the head of the user 1, or the like is acquired as posture information. In this embodiment, the posture acquisition unit 20 corresponds to an acquisition unit.

In this embodiment, a reclining angle of the passenger seat 12 used by the user 1 is read as the posture information of the user 1. For example, the reclining angle is detected by an angle sensor 30 provided to the passenger seat 12 (reclining mechanism). Using the reclining angle allows an angle of the upper body of the user 1 or the like to be easily calculated, for example.

Further, a user image obtained by capturing an image of the user 1 is read as the posture information of the user 1. The user image is captured by, for example, a vehicle interior camera 31 disposed in the internal space 11. For example, a person detection process or the like is performed on the basis of the user image, which allows the posture of the user 1 to be detected in detail.

Further, visual field information regarding the visual field of the user 1, which is detected on the basis of the user image, may be used as the posture information. For example, a direction in which a viewable range of the user 1 (visual field of the user 1) faces, or the like is detectable from the location, the orientation, or the like of the head 3 of the user 1. Such visual field information containing the direction of the visual field of the user 1 and the like may be read as the posture information of the user 1. The type of the posture information or the like is not limited. For example, a location in the front-back direction of the passenger seat 12 that is moved by the reclining mechanism, the height in the up-down direction, or the like may be acquired. Besides, any information capable of expressing the posture of the user 1 may be used as the posture information.

The display information control unit 21 controls display of various types of information on the display target surface 13 on the basis of the posture information of the user 1. The display information control unit 21 includes a display content determination unit 24 and a layout control unit 25.

The display content determination unit 24 determines display content to be displayed on the display target surface 13. In this embodiment, main information and sub-information of a type different from the main information are displayed on the display target surface 13. The main information is, for example, information (main content) to be mainly viewed by the user 1. The sub-information is, for example, information (sub-content) to be appropriately referred to by the user 1.

The main information contains video content selected by the user 1. For example, various types of video content such as live music, sports, movies, and news are displayed as the main information (see FIGS. 8B and 8C). Those pieces of video content can be appropriately read from, for example, the storage unit 111 or the communication unit 103.

Further, the main information contains a video of the outside. For example, a video of the outside such as a video of the front of the vehicle 10 that is captured by a vehicle exterior camera 32 or the like (see FIG. 8A), a video of the other person using video calling, a video in a conference room for a video conference, or the like is displayed as the main information.

Besides, information to be used as the main information is not limited. For example, at the timings of activation and termination of the vehicle 10 (output control unit 105) or in a case where video content is not selected by the user 1, a video displayed by default may be displayed as the main information. Alternatively, for example, video content automatically selected in accordance with the preference of the user 1 or the like may be displayed as the main information by using machine learning or the like.

The sub-information contains notification information to the user 1. For example, an icon for notifying the user 1 of reception of a mail or the like, an incoming call, or the like is displayed as the sub-information. Further, notification information for reporting abnormality of the vehicle 10, a change of a route, or the like may be appropriately displayed.

Further, the sub-information contains menu information. The menu information is, for example, information displayed in a case where the user 1 performs an operation input, and the menu information contains a selection image including options and the like, a setting image for setting parameters and the like, and others. Further, the sub-information contains exterior environment information. For example, information regarding the situations of the outside of the internal space 11 (temperature, weather, and the like), information of the speed and the current location of the vehicle 10, and the like can be displayed as the exterior environment information.

Information to be used as the sub-information is not limited to those pieces of information. For example, information indicating biological information (pulse, blood pressure, and the like) of the user 1 may be displayed as the sub-information. Further, detailed information of the video content displayed as the main information, detailed information of nearby stores, restaurants, and the like, and other information may be displayed as the sub-information. Further, any information automatically selected in accordance with the preference of the user 1 or the like may be displayed as the sub-information by using machine learning or the like.

As described above, the main information and the sub-information are information of the types different from each other. In this embodiment, the main information corresponds to first information, and the sub-information corresponds to second information.

For example, the display content determination unit 24 determines each of information to be displayed as the main information on the display target surface 13 and information to be displayed as the sub-information on the display target surface 13. In other words, it can also be said that the display content determination unit 24 selects each of the main information and the sub-information that are to be displayed on the display target surface 13.

Selection of the main information and the sub-information is executed on the basis of, for example, predetermined instruction information regarding the display on the display target surface 13. The predetermined instruction information contains an instruction of the user 1 via an operation input, an instruction from the outside, which is received via the communication unit 103 or the like, an instruction from the vehicle 10 based on a predetermined program or the like, and others. Besides, the method of generating the instruction information or the like is not limited.

Further, relevant information of a type different from each of the main information and the sub-information is displayed on the display target surface 13. For the relevant information, typically, information related to the content of the main information is used. For example, the display content determination unit 24 can select relevant information related to the main information, which is determined to be displayed on the display target surface 13. In this embodiment, the relevant information corresponds to third information. A determination result of the display content determination unit 24 is output to the layout control unit 25.

The layout control unit 25 controls the display location of each of the main information and the sub-information of the type different from the main information on the display target surface 13, on the basis of the posture information of the user 1. In other words, it can also be said that the display location of the main information and the display location of the sub-information on the display target surface 13 are each set in accordance with the posture of the user 1.

Further, the layout control unit 25 can control the display sizes of the main information and the sub-information on the display target surface 13. For example, a process of adjusting the display size of each piece of the information is executed by scaling the main information and the sub-information. Hereinafter, a region in the display target surface 13, in which the main information is displayed, will be described as a main display region, and a region in the display target surface 13, in which the sub-information is displayed, will be described as a sub-display region. Further, the layout control unit 25 can control the display location and the display size of the relevant information. The relevant information is displayed in accordance with, for example, the main display region in which the main information is displayed.

As described above, the layout (display location, display size, and the like) of each of the main information, the sub-information, and the relevant information displayed on the display target surface 13 is set by the layout control unit 25 on the basis of the posture information of the user 1. Image information for displaying each piece of the information is generated on the basis of the layout. The generated image information is output to a display apparatus 33 for performing display on the display target surface 13.

Figure 4A:
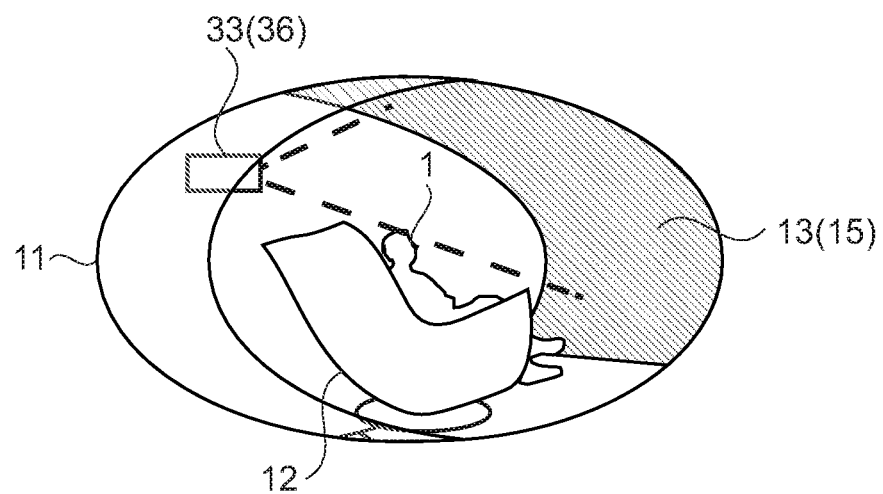
FIGS. 4A, 4B, and 4C are schematic diagrams illustrating configuration examples of a display apparatus for performing display on a display target surface.
Figure 4B:
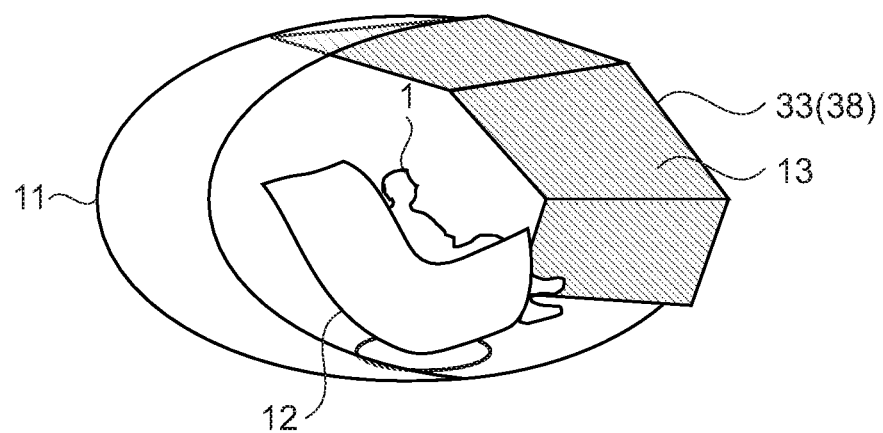
Figure 4C:
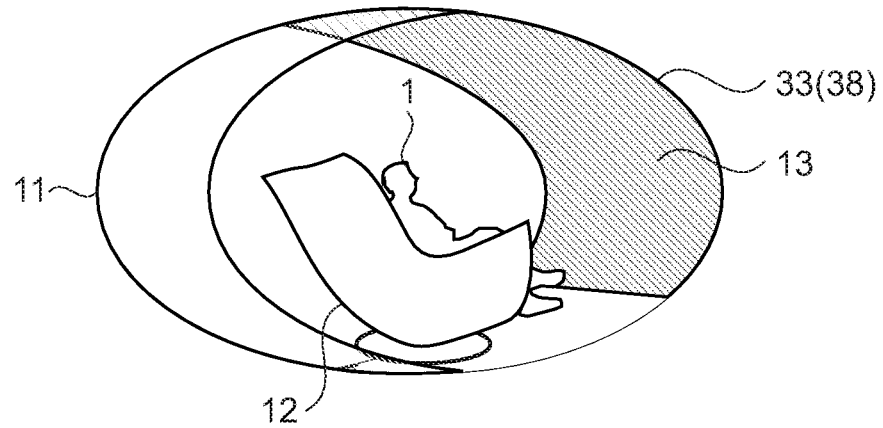

FIGS. 4A, 4B, and 4C are schematic diagrams illustrating configuration examples of the display apparatus 33 for performing display on the display target surface 13. In FIG. 4A, a projector 36 is used as the display apparatus 33. In a case where the projector 36 is used, the display target surface 13 is configured as a screen 15. In other words, a screen 15 disposed so as to cover the surrounding of the user 1 at least from the front toward the upper side is provided in the internal space 11 of the vehicle 10.

The projector 36 is appropriately disposed so as to be capable of projecting an image on the screen 15 (display target surface 13) in the internal space 11 of the vehicle 10, for example. In the example in FIG. 4A, the projector 36 disposed on the upper and rear side of the passenger seat 12 projects an image toward the screen 15. In such a manner, using the projector 36 allows a desired display target surface 13 to be easily configured, for example.

Note that the arrangement, the number, or the like of the projector 36 is not limited. For example, a configuration in which an image is projected from the foot of the user 1 by using a short focus projector 36 or the like may be employed. Further, for example, a configuration in which an image is projected for each of the regions of the screen 15 by using a plurality of projectors 36 may be employed. This makes it possible to easily achieve bright image display or the like.

In FIG. 4B, a plurality of planar displays 37 is used as the display apparatus 33. In this case, the display screen of each of the planar displays 37 functions as the display target surface 13. The plurality of planar displays 37 is disposed, for example, so as to cover the surrounding of the user 1 at least from the front toward the upper side. In the example in FIG. 4B, three planar displays 37 disposed adjacently to one another along the inner wall of the internal space 11 are illustrated.

In such a manner, disposing the plurality of planar displays 37 makes it possible to easily achieve the display target surface 13 that covers the area from the front to the upper side of the user 1. Further, for example, the planar displays 37 or the like to be used for another use application can be diverted, which can suppress the manufacturing costs or the like of the apparatus. Note that the arrangement, the number, or the like of the planar displays 37 constituting the display target surface 13 may be appropriately set in accordance with, for example, the shape, the size, or the like of the internal space 11 of the vehicle 10.

In FIG. 4C, a curved display 38 is used as the display apparatus 33. In this case, the display screen of the curved display 38 functions as the display target surface 13. Therefore, the curved display 38 disposed so as to cover the surrounding of the user 1 at least from the front toward the upper side is disposed in the internal space 11 of the vehicle 10.

For the curved display 38, for example, any display apparatus using liquid crystal, organic EL (Electro-Luminescence), or the like may be used. Using the curved display 38 makes it possible to display a high-resolution and high-quality image and to provide a highly immersive viewing experience.

Besides, specific configurations of the display target surface 13 and the display apparatus 33, and the like can not be limited. For example, it is assumed that a windshield or the like is provided to the front of the internal space 11. In this case, adding a light shielding function such as a liquid crystal shutter to the windshield allows both functions of the screen 15 for projection (display target surface 13) and the windshield to be provided. For example, such a configuration may be employed. In this embodiment, the display apparatus 33 and the output control unit 105 achieve a display system.

Referring back to FIG. 3, the operation input control unit 22 controls a display location of an operation image for the user 1 to perform an operation input. Specifically, the display location of the operation image is calculated on the basis of the posture information of the user 1. Therefore, a location at which the operation image is to be displayed changes in accordance with the posture of the user 1. Information regarding the display location of the operation image is output to an operation input unit 34 disposed at a predetermined location of the internal space 11 of the vehicle 10. A projector of the operation input unit 34 then projects the operation image at a display location calculated by the operation input control unit 22. In this embodiment, the display information control unit 21 and the operation input unit 34 achieve a display control unit.

The sound control unit 23 controls a sound output direction on the basis of the posture information of the user 1. In other words, a direction from which sound is coming is appropriately changed in accordance with the posture of the user 1. For example, the angles or the like of the plurality of speakers (sound system 35) disposed in the internal space 11 are adjusted. Further, for example, for a sound signal to be output to each speaker, sound control such as volume control, waveform control, and bandwidth control (equalizing) is executed. Besides, the method of controlling the sound output direction or the like is not limited. In this embodiment, the sound control unit 23 corresponds to a sound control unit.

Figure 5:
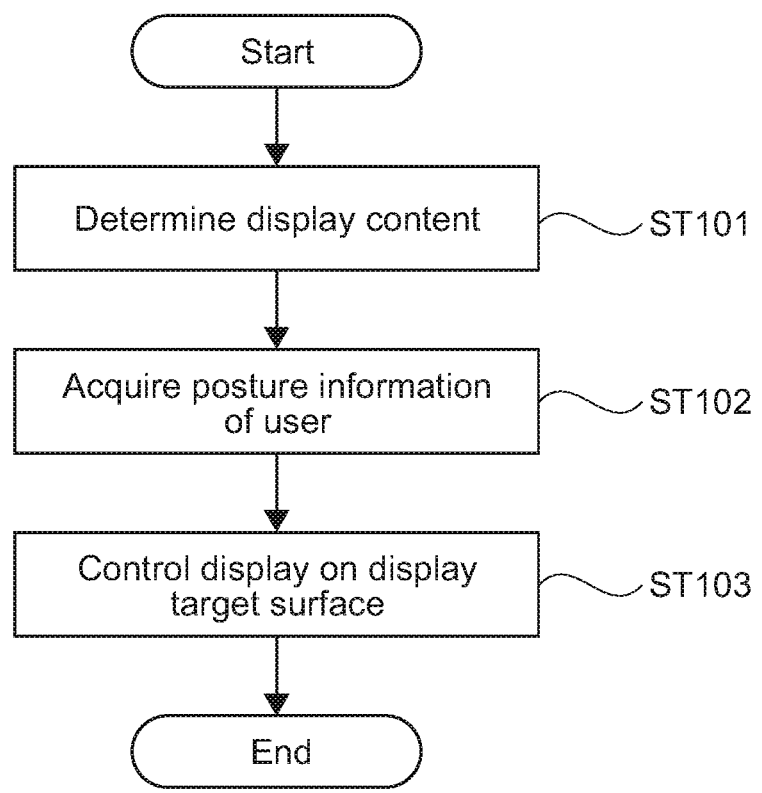
FIG. 5 is a flowchart illustrating an example of a basic process for display control on the display target surface.

FIG. 5 is a flowchart illustrating an example of a basic process of controlling display on the display target surface. The process illustrated in FIG. 5 is, for example, a loop process to be started at a timing at which the user 1 rides on the vehicle 10 and activates the vehicle 10. Further, this process is terminated, for example, when an operation of terminating driving is performed.

The display content determination unit 24 determines display content to be displayed on the display target surface 13 (Step 101). For example, a process of determining each of the main information, the sub-information, and the relevant information to be displayed on the display target surface 13 is executed on the basis of predetermined instruction information regarding display on the display target surface 13.

During execution of the loop process illustrated in FIG. 5, various types of instruction information are generated on the basis of an instruction of the user 1, an instruction from the outside, an instruction from the vehicle 10, and the like. For example, the display content determination unit 24 selects each of the main information, the sub-information, and the relevant information on the basis of instruction information that has been read at the timing at which Step 101 is executed.

Further, in a case where the content of the instruction information is the same as the content used in the immediately preceding loop process, that is, the instruction information is not changed, or in other cases, display content similar to that of the immediately preceding loop process (main information, sub-information, and relevant information) is selected.

Note that the instruction information may include an instruction indicating that the main information is not to be displayed, an instruction indicating that the sub-information is not to be displayed, an instruction indicating that the relevant information is not to be displayed, and the like. Therefore, for example, display content indicating that only the main information and the sub-information are to be displayed and the relevant information is not to be displayed, or display content indicating that only the main information and the relevant information are to be displayed and the sub-information is not to be displayed may be determined.

In such a manner, the display content determination unit 24 can appropriately control the display content to be displayed on the display target surface 13 in accordance with an instruction from the user 1 or the like.

The posture acquisition unit 20 acquires the posture information of the user 1 (Step 102). For example, a reclining angle detected by the angle sensor 30 of the passenger seat 12 is read. Further, a user image captured by the vehicle interior camera 31 is read.

The layout control unit 25 controls a display location on the display target surface 13 on the basis of the posture information of the user 1 (Step 103).

Figure 6:
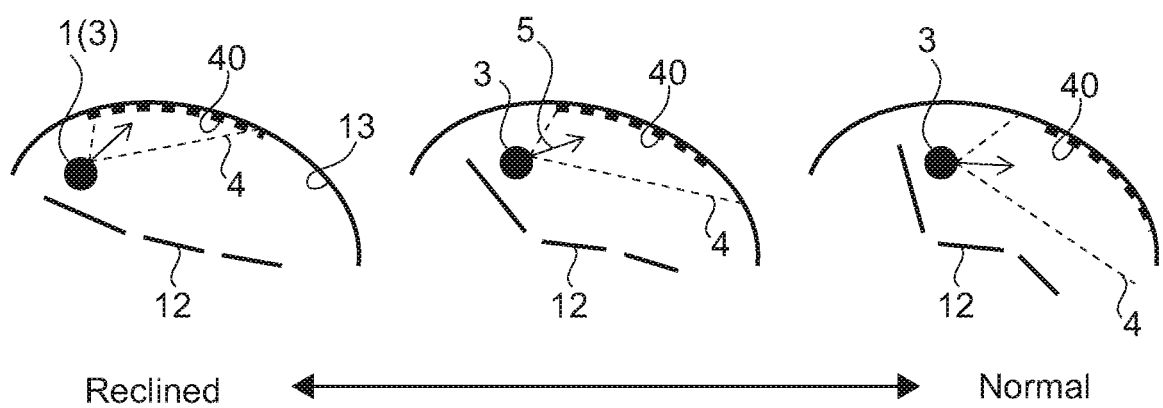
FIG. 6 is a schematic diagram for describing an example of controlling a display location on the display target surface.

FIG. 6 is a schematic diagram for describing an example of controlling a display location on the display target surface 13. FIG. 6 schematically illustrates the passenger seat 12, the head 3 of the user 1 using the passenger seat 12, and the display target surface 13. In the right-side view of FIG. 6, the user 1 raises the backrest and is seated facing the front of the vehicle 10. In the central view of FIG. 6, the user 1 is seated with the backrest being inclined. In the left-side view of FIG. 6, the user 1 is facing up with the backrest being made flat.

In this embodiment, with the center of the visual field of the user 1 being as a reference, a display location of the main information is set. In this disclosure, the center of the visual field of the user 1 includes a substantial center of the visual field of the user 1. FIG. 6 schematically illustrates a visual field 4 of the user 1 by a dotted line. Further, a gaze direction of the user 1 (center gaze direction 5), which is directed to the center of the visual field 4 of the user 1, is schematically illustrated by the arrows.

As illustrated in FIG. 6, when the user 1 changes the reclining angle of the passenger seat 12, the visual field 4 of the user 1 (center gaze direction 5) is changed, and the range of the display target surface 13 that is viewable for the user 1 is changed. Therefore, if the center of the visual field 4 of the user 1 is set as a reference, a display location of the main information can be appropriately set such that the main information properly falls within the visual field 4 even if the posture of the user 1 is changed. Note that information indicating the range of the display target surface 13, to which the visual field 4 of the user 1 is directed, can be calculated on the basis of the posture information of the user 1.

In this embodiment, the layout control unit 25 sets a main display region in which the main information is to be displayed, with the center of the visual field 4 of the user 1 as a reference. For example, the layout of the main information (display location, display size, and the like) is appropriately set such that the center of the visual field 4 of the user 1 is substantially the same as the center of the main display region in which the main information is to be displayed. This allows display of the main content (main information) in front of the user 1 and allows the user 1 to easily view the main content. Note that FIG. 6 schematically illustrates a main display region 40 in the display target surface 13 by a dotted line.

The method of setting the main display region 40 or the like is not limited. For example, the orientation of the head 3 of the user 1 (center gaze direction 5) or the like is calculated from the reclining angle and the user image. A location in which the center gaze direction 5 intersects with the display target surface 13 is then calculated. For example, an intersection location of the display target surface 13 is set to the center of the main display region 40. This allows the main information to be displayed with high accuracy in accordance with an actual posture of the user 1.

Further, it is also possible to set the main display region 40 without calculating the posture, the gaze direction, and the like of the user 1. For example, a table in which the reclining angle of the passenger seat 12, a display location of the main information that corresponds to that angle, and the like are recorded in advance may be used. Appropriately referring to such a table makes it possible to easily set a display location of the main information that corresponds to the current reclining angle, and the like.

Note that in a case where the change in posture of the user 1 is small or the change is temporary, the process of maintaining the setting of the main display region 40 may be executed. For example, in a case where the change in reclining angle is small or the user 1 performs an operation such as temporarily flexing the neck, the display location of the main information is not changed. Such a process may be executed. Thus, a situation where the display location is frequently changed can be avoided, and a stable viewing experience can be provided.

When the main display region 40 is set, a display location of the sub-information is set with the main display region 40 as a reference. Further, the relevant information related to the main information is displayed in a region of the display target surface 13 other than the main display region 40 where the main information is to be displayed. Therefore, the display location of the sub-information and the display location of the relevant information change in accordance with the posture of the user 1. The display locations or the like of the sub-information and the relevant information will be described later in detail with reference to FIGS. 7A, 7B, 7C, 8A, 8B, and 8C and the like.

In such a manner, in this embodiment, the display location of each of the main information, the sub-information, and the relevant information that are displayed on the display target surface 13, and the like are appropriately controlled on the basis of the posture information of the user 1. From a different perspective, it can also be said that the output control unit 105 can appropriately control the entire layout of the display content to be displayed on the display target surface in accordance with the posture of the user 1.

Figure 7A:
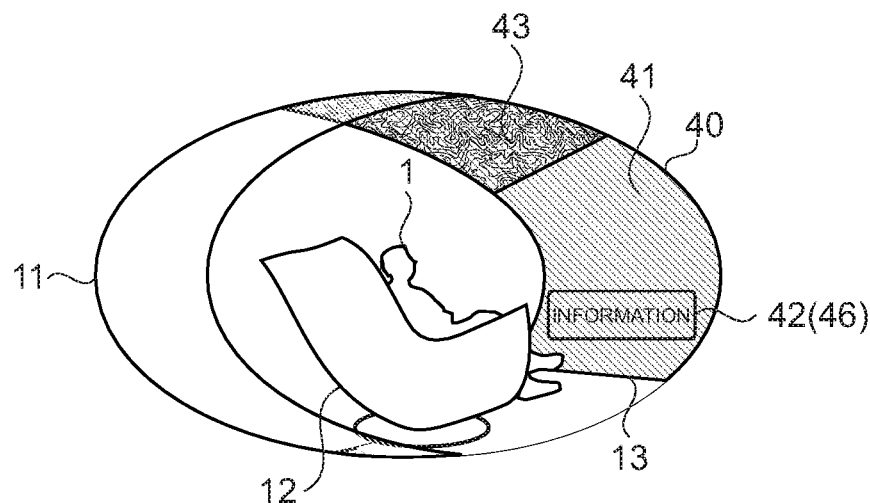
FIGS. 7A, 7B, and 7C are schematic diagrams illustrating examples of display locations of main information, sub-information, and relevant information.
Figure 7B:
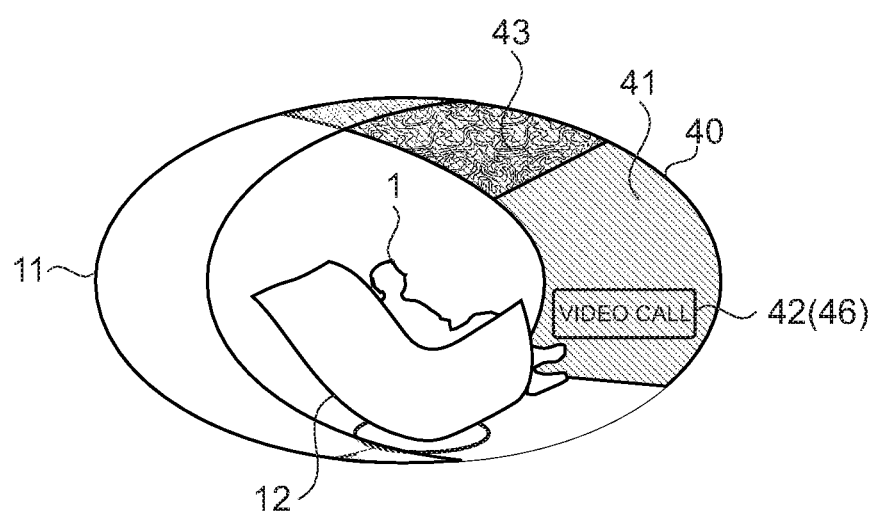
Figure 7C:
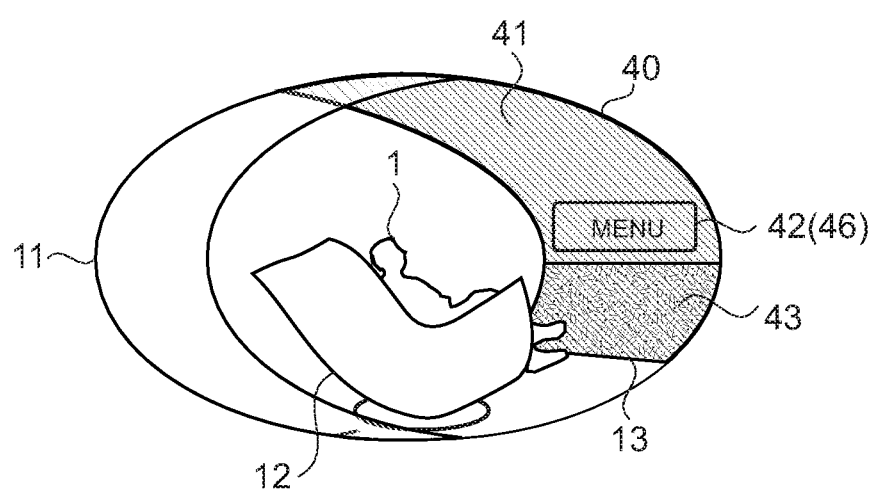

FIGS. 7A, 7B, and 7C are schematic diagrams illustrating examples of the display locations of the main information, the sub-information, and the relevant information. In FIG. 7A, a video of the front of the vehicle 10 (landscape during movement) is displayed as main information 41. In FIG. 7B, a music video is displayed as the main information 41. In FIG. 7C, a video of fireworks is displayed as the main information 41.

Figure 8A:
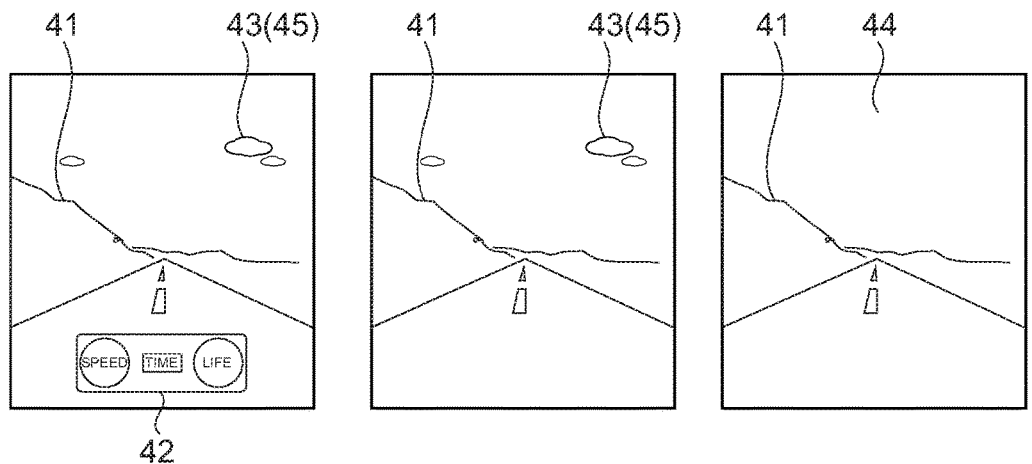
FIGS. 8A, 8B, and 8C are schematic diagrams illustrating examples of the main information, the sub-information, and the relevant information.
Figure 8B:
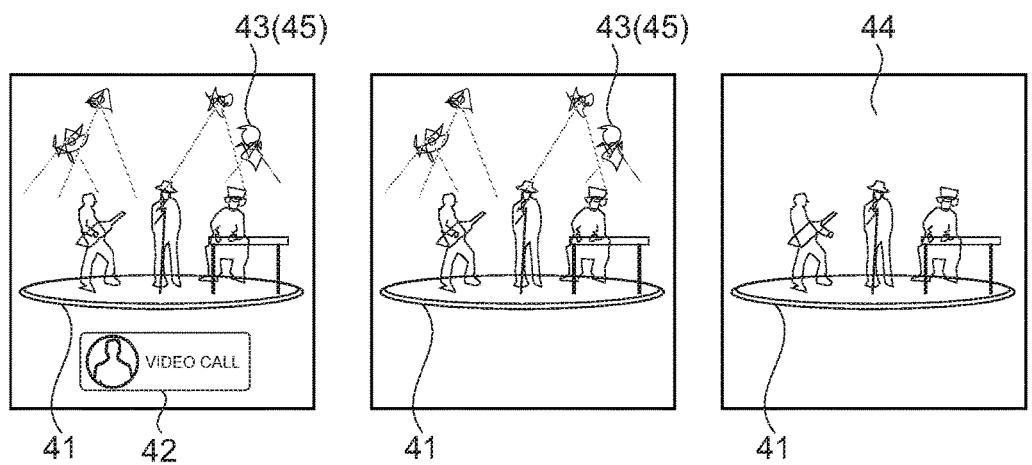
Figure 8C:
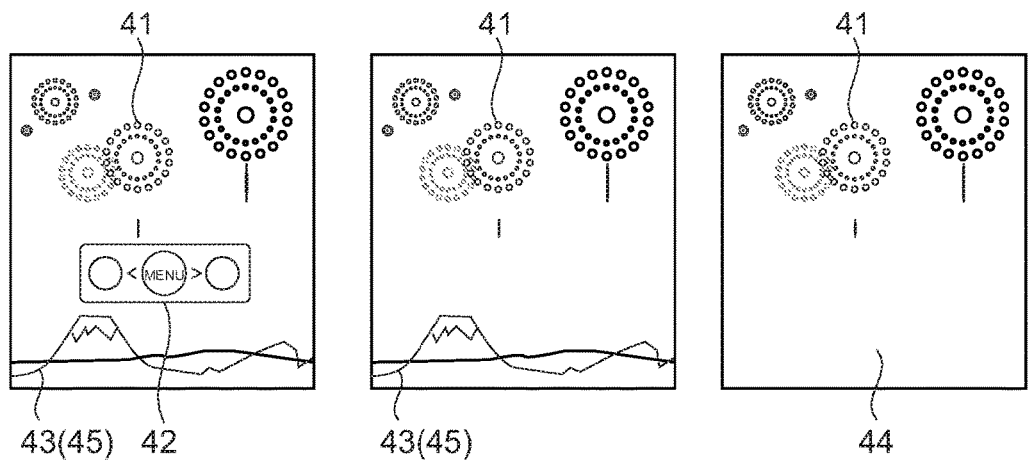

FIGS. 8A, 8B, and 8C are schematic diagrams illustrating examples of the main information 41, sub-information 42, and relevant information 43. On the left sides of FIGS. 8A, 8B, and 8C, display examples of the main information 41, the sub-information 42, and the relevant information 43 used in FIGS. 7A, 7B, and 7C are schematically illustrated. Further, at the centers of FIGS. 8A, 8B, and 8C, the schematic diagrams of the main information 41 and the relevant information 43 are illustrated. On the right sides of FIGS. 8A, 8B, and 8C, the schematic diagrams of the main information 41 are illustrated. Note that the outer frame of each diagram illustrated in FIGS. 8A, 8B, and 8C corresponds to the outer frame of the display target surface 13.

In FIG. 7A, the user 1 is seated on the passenger seat 12 while facing the front of the vehicle 10. Therefore, the visual field 4 of the user 1 is directed to the front of the vehicle 10. With the center of the visual field 4 of the user 1 as a reference, the main display region 40 is set such that the landscape during movement (main information 41) that is the video of the outside of the vehicle 10 is displayed in front of the user 1.

The relevant information is displayed outside of the main display region 40. As illustrated on the right side of FIG. 8A, a surplus region 44 is generated on the upper side of the landscape during movement in the display target surface 13. As illustrated at the center of FIG. 8A, relevant information (image of sky or the like) related to the main information 41 (landscape during movement) is displayed in the surplus region 44. In such a manner, an extension image that extends the space expressed by the main information 41 displayed in the main display region 40 can be used as the relevant information 43.

The method of generating the extension image 45 or the like is not limited. For example, an image of the sky, which is capable of being naturally connected to the upper end of the video of the landscape during movement in FIG. 8A, or the like is generated. Thus, the extension image 45 can be extended to the outside of the main display region 40 in a natural manner. Further, the color of the sky in the landscape during movement or the like is analyzed, and an image of the sky with a tone harmonious with the color of the sky of the landscape during movement is generated as the extension image 45. Thus, such a visual effect as displaying the landscape during movement can be exerted over the entire display target surface 13, and an expansive space can be produced.

The layout control unit 25 is capable of displaying the sub-information 42 in the periphery of the main display region 40. Here, the periphery of the main display region 40 is, for example, a location deviated from the center of the main display region 40 and includes the inner side of the main display region 40, a boundary between the regions, the outer side thereof, and the like. Further, the layout control unit 25 is capable of displaying the sub-information 42 in a manner superimposed on the main display region 40. This allows the sub-information 42 to be displayed at a location easily viewable by the user 1 and allows improvement in usability.

In the example illustrated in FIG. 7A, a sub-display region 46 for displaying the sub-information 42 is set at a location on the lower side of the center of the main display region 40. In other words, the sub-display region 46 is set on the lower side of the center of the visual field 4 of the user 1. Setting the sub-display region 46 on the lower side of the center of the visual field 4 of the user 1 allows the user 1 to easily refer to the sub-information 42 by, for example, slightly moving the eye level. Note that, in the actual display, the frame or the like that indicates the sub-display region 46 is not displayed.

Further, for example, the sub-display region 46 can be appropriately set in a region outside of the main display region 40 and also falling within the average visual field range of the user 1. In other words, the sub-display region 46 may be set without hindering the viewing of the main information 41 displayed in the main display region 40 and so as to allow the user 1 to easily refer to the sub-information 42. Besides, a display location of the sub-information 42 can be set to a location deviated from the center of main display region 40, such as the upper side, the left side, and the right side of the center of the main display region 40. The method of setting the display location of the sub-information 42 or the like is not limited. For example, the sub-display region 46 may be set in a display location that is easily viewable by the user 1 and also has no impact on the viewing of the main information 41, on the basis of ergonomics or the like. Further, the display location of the sub-information 42 or the like may be appropriately set in accordance with the type of the main information 41 or the like. For example, in a case where video content (movie, TV program, music video, etc.) that the user 1 views in a concentrated manner is displayed as the main information 41, the sub-information 42 is displayed outside of the main display region 40. Further, in a case where video content (fireworks, mountain scenery, background video (BGV), etc.) for producing the internal space 11 of the vehicle 10 is displayed as the main information 41, the sub-information 42 is displayed in a manner superimposed on the main display region 40. Such a process may be executed.

In the example illustrated in FIG. 7B, a music video selected by the user 1 is displayed as the main information 41. The main display region 40 in which the music video is displayed is set in front of the user 1. Therefore, the surplus region 44 is generated on the display target surface 13 on the upper side of the user 1. In this case, as illustrated on the right side and at the center of FIG. 8B, an image of a light that illuminates the stage or the like (extension image 45) is used as the relevant information 43 related to the music video. This allows such a visual effect as extending the upper space of the stage to be achieved.

Further, for example, if the user 1 reclines the backrest of the passenger seat 12 and the visual field 4 of the user 1 is shifted to the upper side, the main display region 40 is shifted to the upper side in association with the shift of the visual field 4. As a result, the surplus region 44 may be generated on the lower side of the display target surface 13. In such a case, for example, an image of audience warming up the live concert in front of the stage or the like is newly displayed as the relevant information 43.

Further, it is assumed that the user 1 receives a video calling during viewing of the music video. In this case, as illustrated on the left side of FIG. 8B, an icon to indicate the video calling or the like is displayed as the sub-information 42. In such a manner, various types of notification information can be displayed as the sub-information 42.

The user 1 can start or refuse the video calling by executing a predetermined input operation via an operation image 60 or the like. For example, in a case where the video calling is started, a video of the other communication party is selected as the main information 41 and displayed on the display target surface 13. Such a process may be executed.

In the example illustrated in FIG. 7C, a video of fireworks is displayed as the main information 41. Further, the passenger seat 12 is reclined and the visual field 4 of the user 1 is directed toward the obliquely upper side. Therefore, the main display region 40 in which the video of fireworks is to be displayed is set on the upper side of the display target surface 13, and the relevant information 43 is displayed on the lower side of the display target surface 13.

As illustrated on the right side and at the center of FIG. 8C, the extension image 45 including, for example, a mountain scenery and the like is displayed as the relevant information 43 of the video of fireworks. This allows the lower space of the video of fireworks to be extended.

In the video of fireworks, sound of shooting off fireworks, sound of exploding fireworks, and the like are reproduced. In such a case, for example, the sound control unit 23 detects the inclination of the upper body of the user 1, the location of the head, and the like on the basis of the posture information of the user 1. The sound output direction is then appropriately controlled in accordance with the detected posture of the user 1.

For example, such control as to output the sound of shooting off fireworks from around a foot of the user 1 and to output the sound of exploding fireworks from the front of the user 1 is executed. This allows a sound space of realistic sensation to be achieved and allows excellent entertainment properties to be exerted.

Further, it is assumed that the user 1 performs an operation input during viewing of the video of fireworks. In this case, as illustrated in the left side of FIG. 8C, menu information including icons indicating various types of options and the like is displayed as the sub-information 42. Note that the display example illustrated in the left side of FIG. 8C is a display example in a case where the user 1 reclines the backrest, and the visual field of the user 1 is directed to the range where the video of fireworks is displayed. Therefore, the sub-information 42 is displayed on the lower side of the center of the visual field of the user 1.

Note that in a case where an operation input performed by the user 1 is not detected within a predetermined period of time, a process of deleting the sub-information 42 and displaying only the main information 41 and the relevant information 43 may be executed. This allows the user 1 to view only the extended video of fireworks and to continue a viewing experience without caring about unnecessary display.

Various types of display can be performed other than the main information, the sub-information, and the relevant information described in FIGS. 7A, 7B, 7C, 8A, 8B, and 8C. For example, live videos by relay broadcasting for sports such as baseball and soccer and the like may be displayed as main content (main information 41). In this case, for example, an image indicating additional information such as the name, the position, and the like of a player playing the game and the like can be used as the relevant information 43. In such a manner, the relevant information 43 may include additional information regarding the main information 41. Thus, for example, information requested by the user 1 and the like can be simultaneously displayed, and a viewing experience with high entertainment properties can be provided.

FIGS. 9 to 16 are schematic diagrams each illustrating an example of a display pattern of the sub-information 42. Note that the outer frame in FIGS. 9 to 16 indicates the sub-display region 46. In the actual display, the frame or the like that indicates the sub-display region 46 is not displayed.

Figure 9:
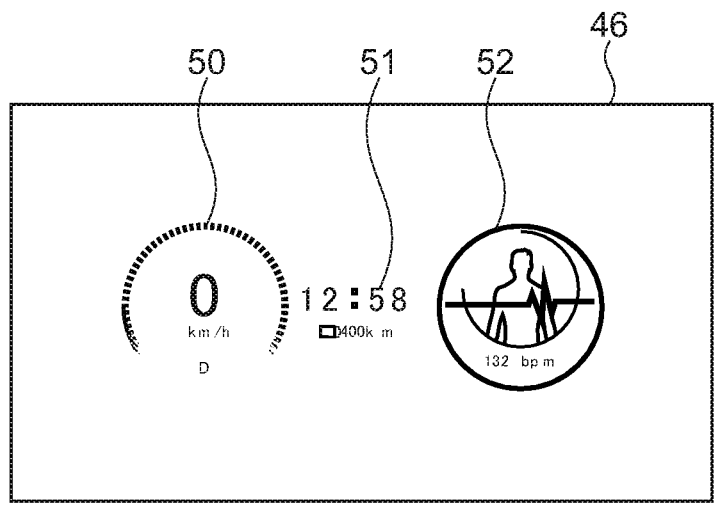
FIG. 9 is a schematic diagram illustrating an example of a display pattern of the sub-information.

FIG. 9 is an example of a display pattern of vehicle body information 50, time information 51, and biological information 52 of the user 1. In FIG. 9, a circular indicator indicating the speed of the vehicle 10, the remaining battery level, a distance to empty, and the like are displayed as the vehicle body information. Besides, the number of revolutions of an engine or a motor, a location or direction of the vehicle 10, and the like may be displayed as the vehicle body information.

Further, the current time is displayed at the center of FIG. 9. Besides, an expected arrival time at a destination, time necessary for movement, and the like may also be displayed. On the left side of FIG. 9, the biological information 52 of the user 1 is displayed. For example, a blood pressure, beats per minute, timing of heartbeat, and the like of the user 1 are appropriately acquired by a biological sensor and displayed graphically. Besides, various types of biological information 52 such as body temperature, oxygen content in blood, and the like of the user 1 may be displayed.

For example, the sub-information 42 illustrated in FIG. 9 is displayed at the initial activation of the vehicle 10 (display target surface 13). In other words, the display as illustrated in FIG. 9 is displayed by default at the activation of the vehicle 10. Such a process may be executed.

Figure 10:
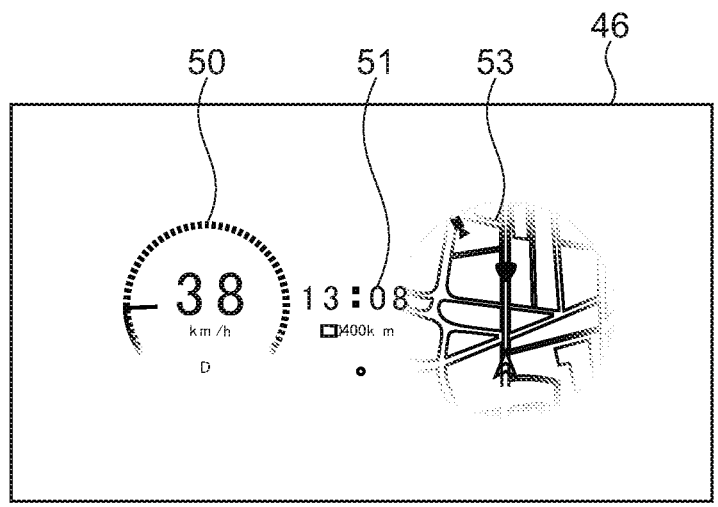
FIG. 10 is an example of a display pattern of map information.

FIG. 10 is an example of a display pattern of map information 53. In the left side and at the center of FIG. 10, the vehicle body information 50 and the time information 51 described with reference to FIG. 9 are displayed. Further, on the right side of FIG. 10, a navigation image including a map of the surrounding of the vehicle 10, the current location of the vehicle 10, and the like is displayed. A specific configuration of the map information is not limited.

For example, the sub-information 42 illustrated in FIG. 10 is displayed at the timing at which the vehicle 10 starts to drive. In other words, when the vehicle 10 starts to drive, the biological information 52 illustrated in FIG. 9 is switched to the map information 53 illustrated in FIG. 10. Such a process may be executed.

Figure 11:
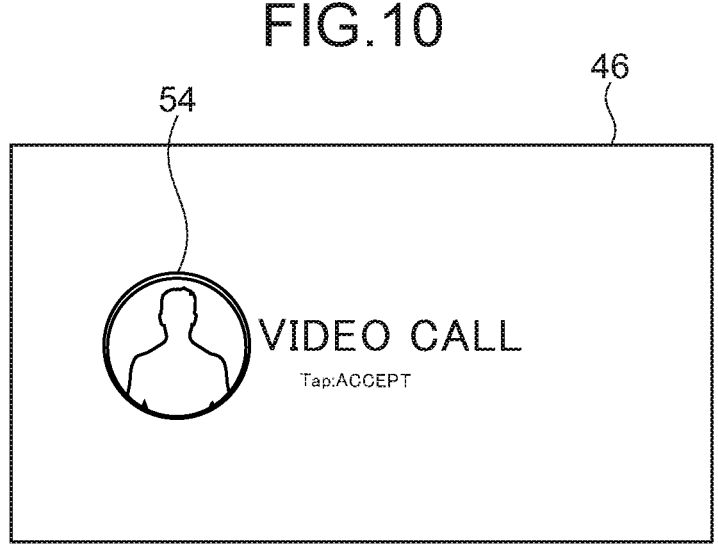
FIG. 11 is an example of a display pattern of notification information from a service.

FIG. 11 is an example of a display pattern of notification information 54 from a service. For example, if a calling request is received from the outside by a video calling service, an icon indicating the notification information as illustrated in FIG. 11 is displayed. Further, a message indicating an operation necessary for receiving the calling request (for example, an operation of tapping a predetermined location) or the like may be displayed together.

Figure 12:
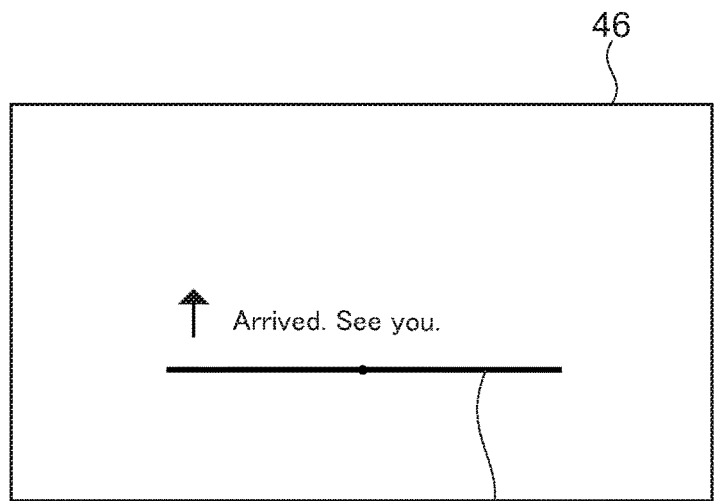
FIG. 12 is an example of a display pattern of notification information from the vehicle.

FIG. 12 is an example of a display pattern of the notification information 54 from the vehicle 10. For example, when the vehicle 10 has arrived at a destination, a message indicating the arrival or the like is displayed. In such a manner, the notification information 54 for the user 1 is appropriately displayed as sub-content (sub-information 42) on the display target surface 13. This allows the user 1 to appropriately refer to a necessary notification.

Figure 13:
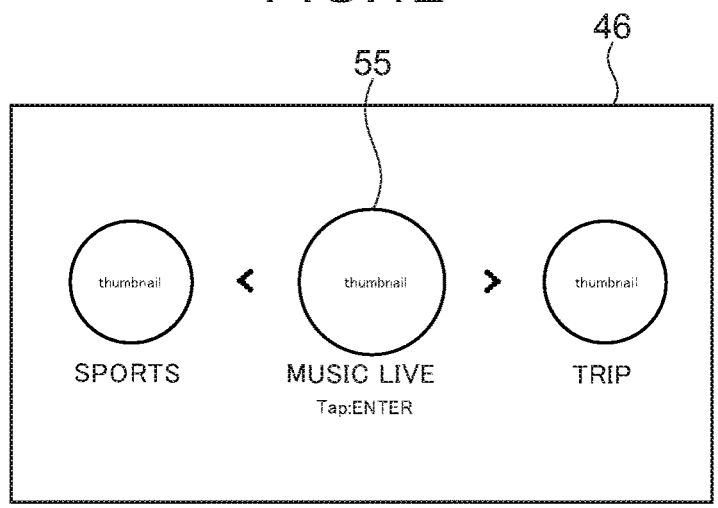
FIG. 13 is an example of a display pattern of menu information.

FIG. 13 is an example of a display pattern of menu information 55. In the example illustrated in FIG. 13, a plurality of icons indicating options is displayed. The icon at the center indicates an option to be selected. For example, if the user 1 performs a swipe operation or the like at a predetermined location, an option to be selected can be changed.

For example, a thumbnail or the like representing the content of the option is displayed inside of the icon. This allows a menu to be intuitively selected and allows the operability to be improved. Further, a message indicating an operation necessary for determining a selection or the like is displayed on the display target surface 13. This allows the user 1 to perform an operation near the hand according to the message while viewing the display target surface 13.

Figure 14:
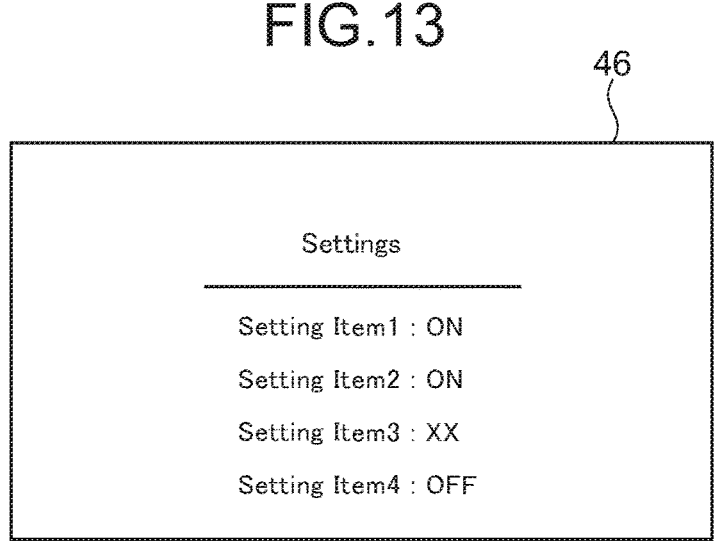
FIG. 14 is an example of a display pattern of a setting list.

FIG. 14 is an example of a display pattern of a setting list. In the setting list, various setting items such as a setting item regarding display on the display target surface 13, a setting item regarding sound, and a setting item regarding the operation of the vehicle 10 can be confirmed. In FIG. 14, on/off states of the setting items, set numerical values, and the like can be confirmed.

Figure 15:
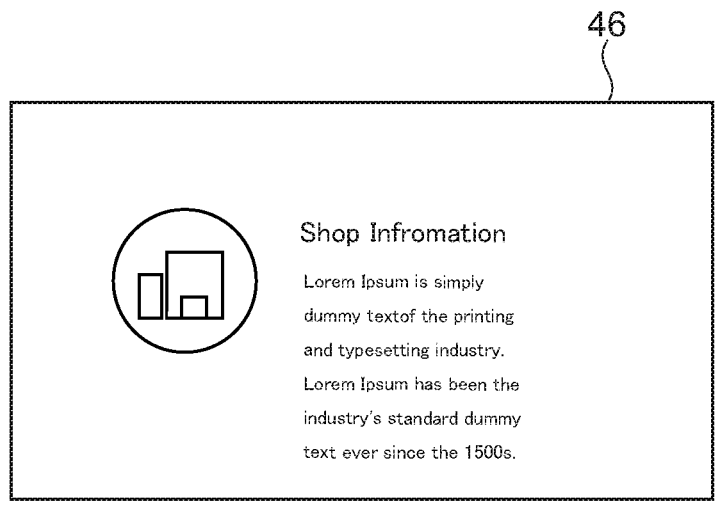
FIG. 15 is an example of a display pattern of detailed information.

FIG. 15 is an example of a display pattern of detailed information. For example, detailed information regarding the content selected by the user 1, stores around the vehicle 10, and the like can be displayed as the sub-information 42. In the example illustrated in FIG. 15, detailed information is displayed by an icon (thumbnail) and a text. The detailed information is not limited to the above, and for example, pictures, moving images, and the like may be displayed as the detailed information.

Figure 16:
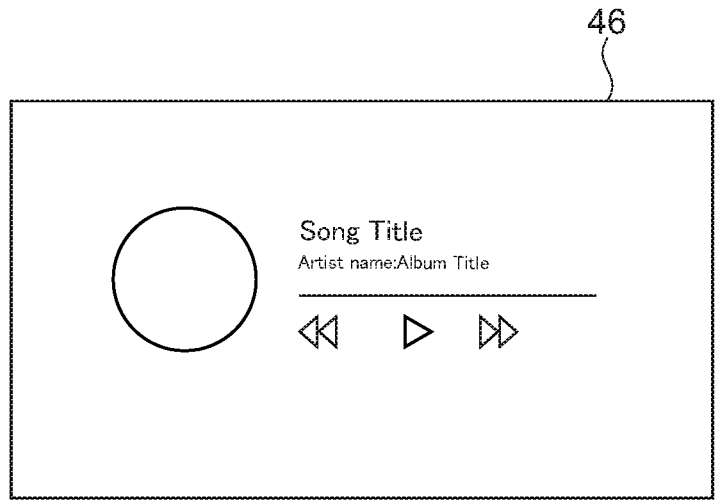
FIG. 16 is an example of a display pattern of a content controller.

FIG. 16 is an example of a display pattern of a content controller. For example, in a case where the video content selected by the user 1 or the like is reproduced, the control for video content, such as stop/reproduction, fast backward/fast forward, and the like is executed using the content controller or the like. Such information may be displayed as sub-content (sub-information 42).

Note that the display pattern of the sub-information 42 is not limited to the display patterns illustrated in FIGS. 9 to 16. For example, any display pattern corresponding to the type of the sub-information 42 may be capable of being displayed on the display target surface 13. Further, the size or the like of a range in which the sub-information 42 is to be displayed (sub-display region 46) is not also limited, and the sub-display region 46 can be appropriately set in accordance with the number of pieces of sub-information 42 to be displayed, and the shape of a display pattern 61.

Figure 17:
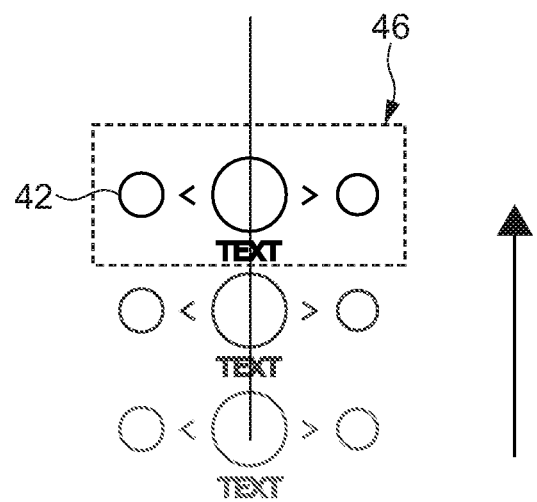
FIG. 17 is a schematic diagram illustrating an example of a method of displaying the sub-information.

FIG. 17 is a schematic diagram illustrating an example of the method of displaying the sub-information 42. In FIG. 17, when the sub-information 42 is displayed, animation is used. For example, it is assumed that the display location (sub-display region 46) of the sub-information 42 is set on the lower side of the center of the visual field 4 of the user 1 or the like. For example, the sub-information 42 is displayed so as to move toward the set display location from the outside (lower side of the screen) of the visual field 4 of the user 1.

Further, the sub-information 42 is displayed such that its color becomes darker (transparency becomes lower) as the sub-information 42 approaches the display location. In other words, the animation in which the sub-information 42 fades in from the outside of the visual field 4 toward the display location is displayed. Using such animation allows the sub-information 42 to be displayed toward the viewable range (optimal eyesight area) of the user 1 such that the video content being viewed by the user or the like is not disturbed.

Further, use of a visual effect of gradually deepening the color or the like allows the sub-information 42 to be naturally displayed so as to be harmonious with the main information 41 or the like. Further, the sub-information 42 is displayed while moving, and thus the user 1 can easily notice the sub-information 42.

The method of displaying the sub-information 42 is not limited. For example, such animation as to move the sub-information 42 in the right-left direction may be used. Alternatively, a process of fade-in/fade-out without moving the sub-information 42 from the set display location may be executed. Besides, any visual process of displaying the sub-information 42 may be displayed.

Figure 18:
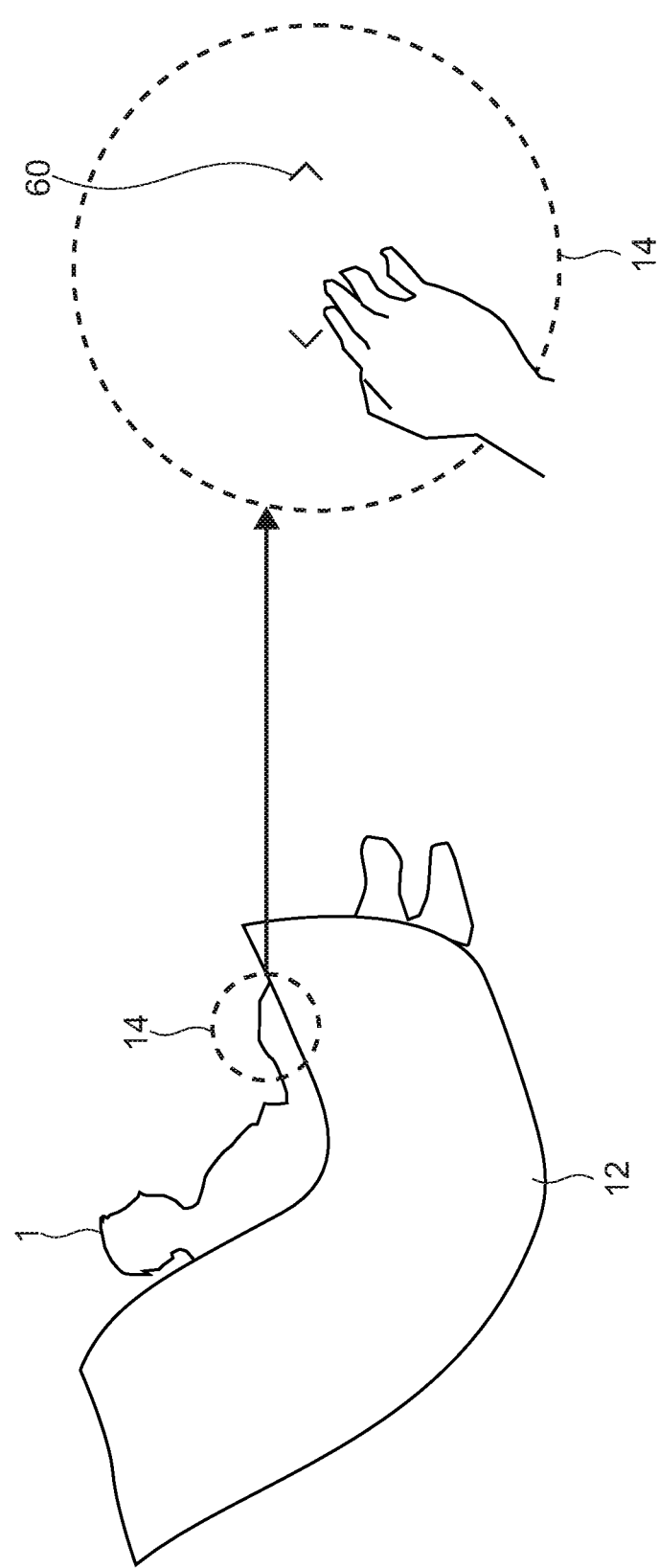
FIG. 18 is a schematic diagram illustrating an example of an operation input performed by a user.

FIG. 18 is a schematic diagram illustrating an example of an operation input performed by the user 1. On the left side of FIG. 18, the user 1 seated on the passenger seat 12 is schematically illustrated. Further, on the right side of FIG. 18, an operation region 14 in which the operation image 60 for the user 1 to perform an operation input is displayed is schematically illustrated.

In this embodiment, the operation input control unit 22 sets the operation region 14, in which the operation image 60 is displayed, around the user 1 on the basis of the posture information of the user 1. Here, "around the user 1" is, for example, within the reach of the user 1, or a range capable of a manual operation input or the like.

For example, the reach of the user 1 or the like is calculated on the basis of the reclining angle of the passenger seat 12 or the user image, which is read by the posture acquisition unit 20. The operation region 14 is set in a region or the like where an image can be projected within the calculated range.

Further, for example, a table in which the reclining angle of the passenger seat 12 and the operation region 14 set in accordance with that angle are recorded in advance, or the like may be used. In this case, the operation region 14 corresponding to the current reclining angle is appropriately read from the table. Such a process may be executed.

In the example illustrated in FIG. 18, the operation region 14 is set in the armrest of the passenger seat 12. The information of the set operation region 14 is output to the operation input unit 34 (not illustrated), and the operation image 60 is projected to the operation region 14 by the projector of the operation input unit 34. As a result, the user 1 can execute a predetermined operation input by using the operation image 60 displayed near the hand.

The operation image 60 is displayed such that a location at which a finger or hand of the user 1 is placed is the start point of an operation input, for example. This makes it possible to easily perform a selection of right, left, up, and down, a determination operation such as tapping, a swipe operation, a rotation operation, and the like.

In FIG. 18, right/left selection icons are displayed as the operation image 60. For example, it is assumed that the user 1 performs an operation of touching the left icon. In this case, the operation of the user 1 is detected by the sensing camera of the operation input unit 34, and it is determined that the left icon is selected. Similarly, if the operation of touching the right icon is performed, it is determined that the right icon is selected. In such a manner, the user 1 can perform any operation input by performing an operation near the hand in accordance with the operation image 60. Note that the operation image 60 will be described later in detail with reference to FIG. 21.

Further, in a case where the user 1 makes the backrest of the passenger seat 12 flat, it is conceived that the user has difficulty of seeing the hand on the armrest. In such a case, the operation region 14 is set in another region that is viewable by the user 1 and is within the reach of the user 1 (for example, the side surface of the internal space 11 of the vehicle 10, etc.), and the operation image 60 is displayed in the set operation region 14. This allows the user 1 to easily execute an operation input even if the posture of the user 1 is changed.

Figure 19:
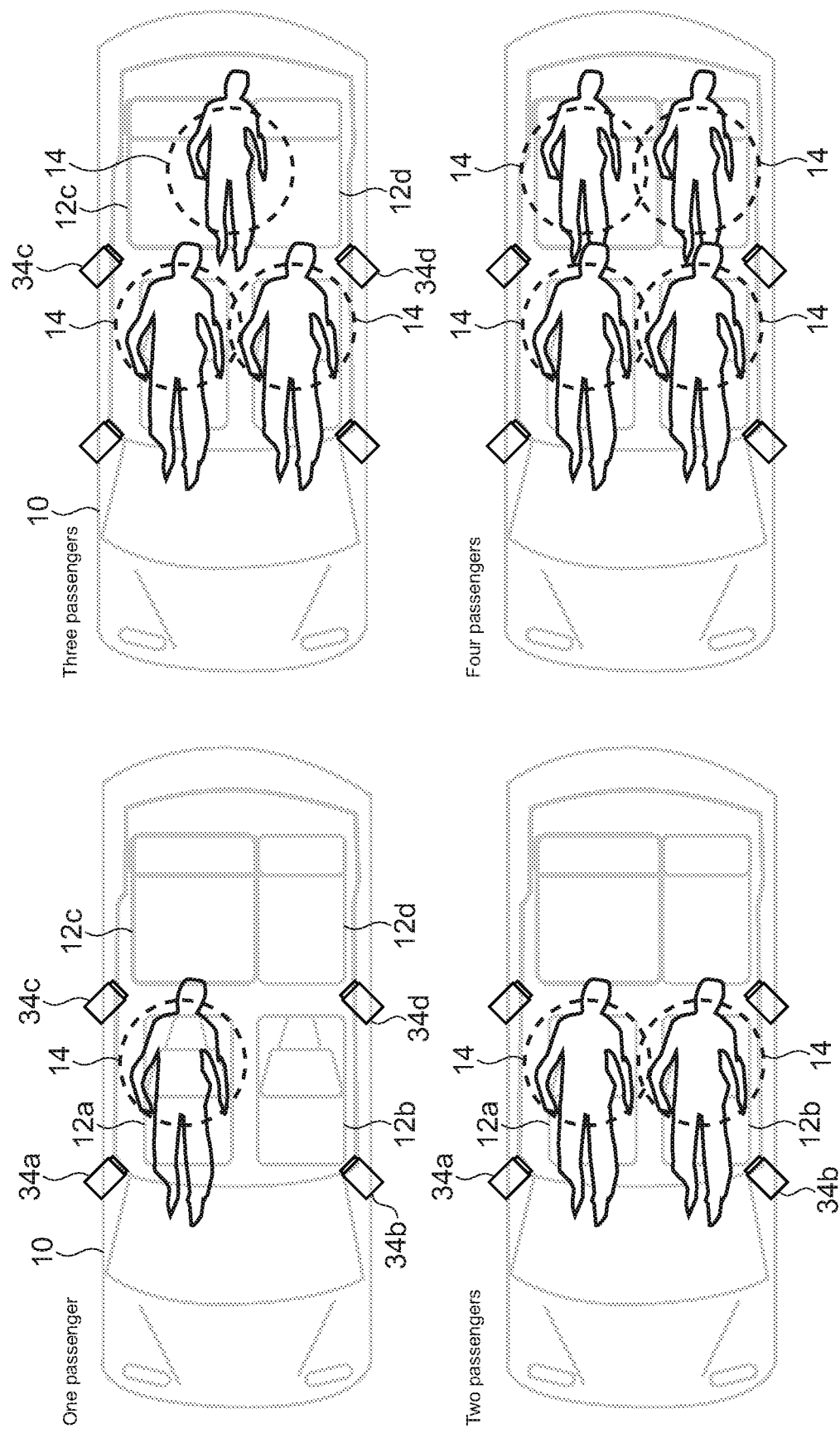
FIG. 19 is a schematic diagram illustrating an example of a display location of an operation region.
Figure 20:
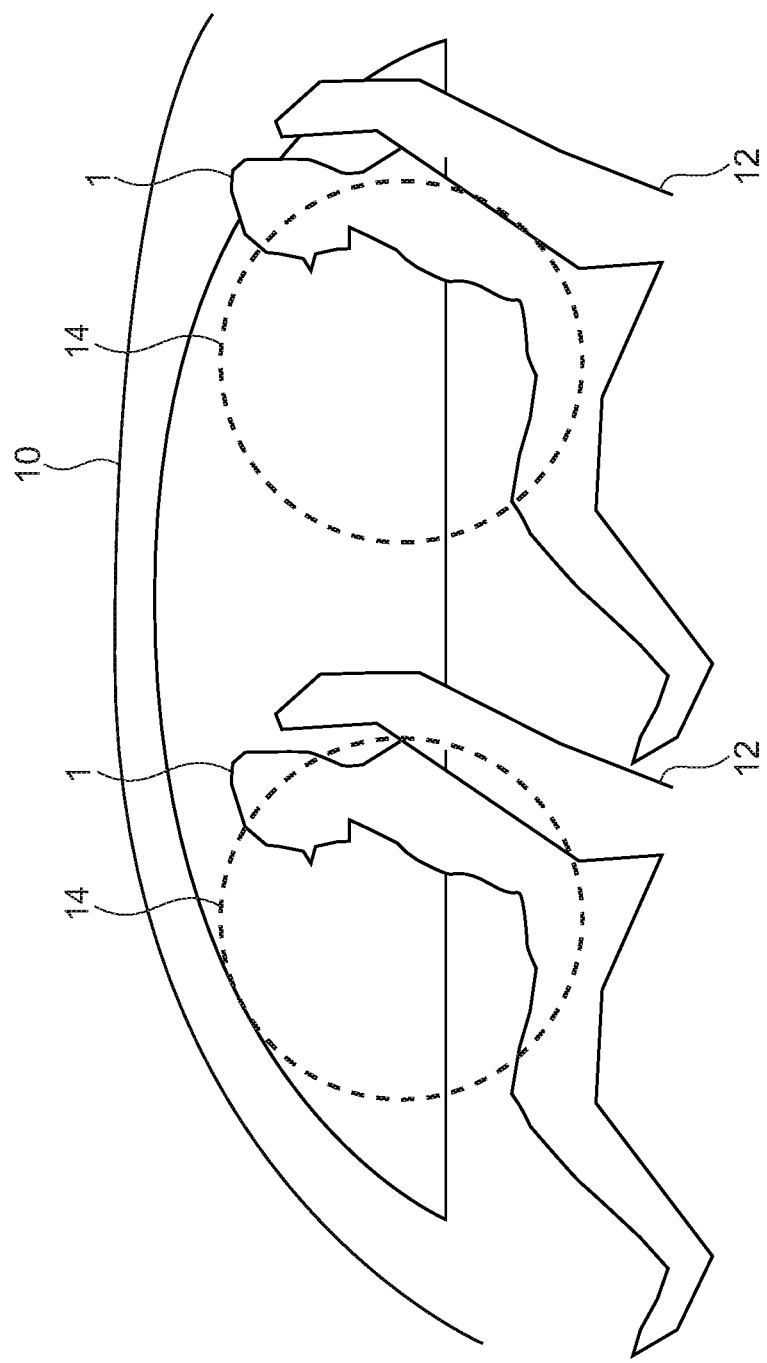
FIG. 20 is a schematic diagram illustrating an example of a display location of the operation region.

FIGS. 19 and 20 are schematic diagrams each illustrating an example of a display location of the operation region 14. In FIG. 19, a display location of the operation region 14 will be described using an example of a four-seater vehicle 10. In the vehicle 10, four passenger seats 12a to 12d and four operation input units 34*a* to 34*d* (projectors and sensing cameras) are respectively provided.

The operation input unit 34*a* and the operation input unit 34*b* are provided to the front pillars (A pillars) on the right side and the left side of the vehicle 10. Further, the operation input unit 34*c* and the operation input unit 34*d* are provided to the center pillars (B pillars) on the right side and the left side of the vehicle 10. The installed locations or the like of the operation input units 34 are not limited.

In a case where a user 1 rides on the vehicle 10 (upper left diagram), the operation region 14 is set around the user 1. For example, the operation image 60 is displayed around the user 1 by the operation input unit 34*a* installed on the right-side front pillar, which is the closest to the right front passenger seat 12*a* on which the user 1 is seated.

In a case where two users 1 ride on the vehicle 10 (lower left diagram), the operation regions 14 are set around the respective users 1. At that time, the operation input unit 34*a* displays the operation image 60 around the user 1 on the right front side, and the operation input unit 34*b* displays the operation image 60 around the user 1 on the left front side. Note that the operation input unit 34*a* (34*b*) may display the operation image 60 around the user 1 on the left front side (right front side).

In a case where three users 1 ride on the vehicle 10 (upper right diagram), a user 1 rides in a rear passenger seat 12. For example, in a case of a bench-type seat including adjacent rear passenger seats 12*c* and 12*d* as illustrated in FIG. 19, it is conceivable that the user 1 sits in the middle part between the passenger seats 12*c* and 12*d*. In such a case, the operation image 60 is appropriately displayed around the user 1 at the rear center by using one of the operation input units 34*c* and 34*d* installed on the center pillars.

In a case where four users 1 ride on the vehicle 10 (lower right diagram), for example, the operation input unit 34*c* displays the operation image 60 around the user 1 on the right rear side, and the operation input unit 34*d* displays the operation image 60 around the user 1 on the left rear side. In such a manner, even if the number of passengers to ride on the vehicle 10, locations to be seasted, and the like are changed, the operation image 60 and the like can be properly displayed for each of the users 1 riding on the vehicle 10.

FIG. 20 illustrates a schematic diagram of a case where the internal space 11 of the vehicle 10 illustrated in FIG. 19 is seen from the side surface. Note that, in FIG. 20, the illustration of the operation input units 34 in FIG. 19 is omitted. As illustrated in FIG. 20, the operation image 60 can be displayed on the side surface of the internal space 11, such as a door panel. Further, for the user 1 seated in the rear passenger seat 12 (rear seat), it is also possible to display the operation image 60 on a rear surface portion or the like of the front passenger seat 12 (front seat).

The display location of the operation image 60 is not limited. For example, in a case where a window provided to the side surface of the vehicle 10 has a light shielding function or the like, it is also possible to display the operation image 60 on the window. Besides, the operation image 60 may be displayed in any location within the reach of the user 1 in accordance with the posture of each user 1.

Figure 21:
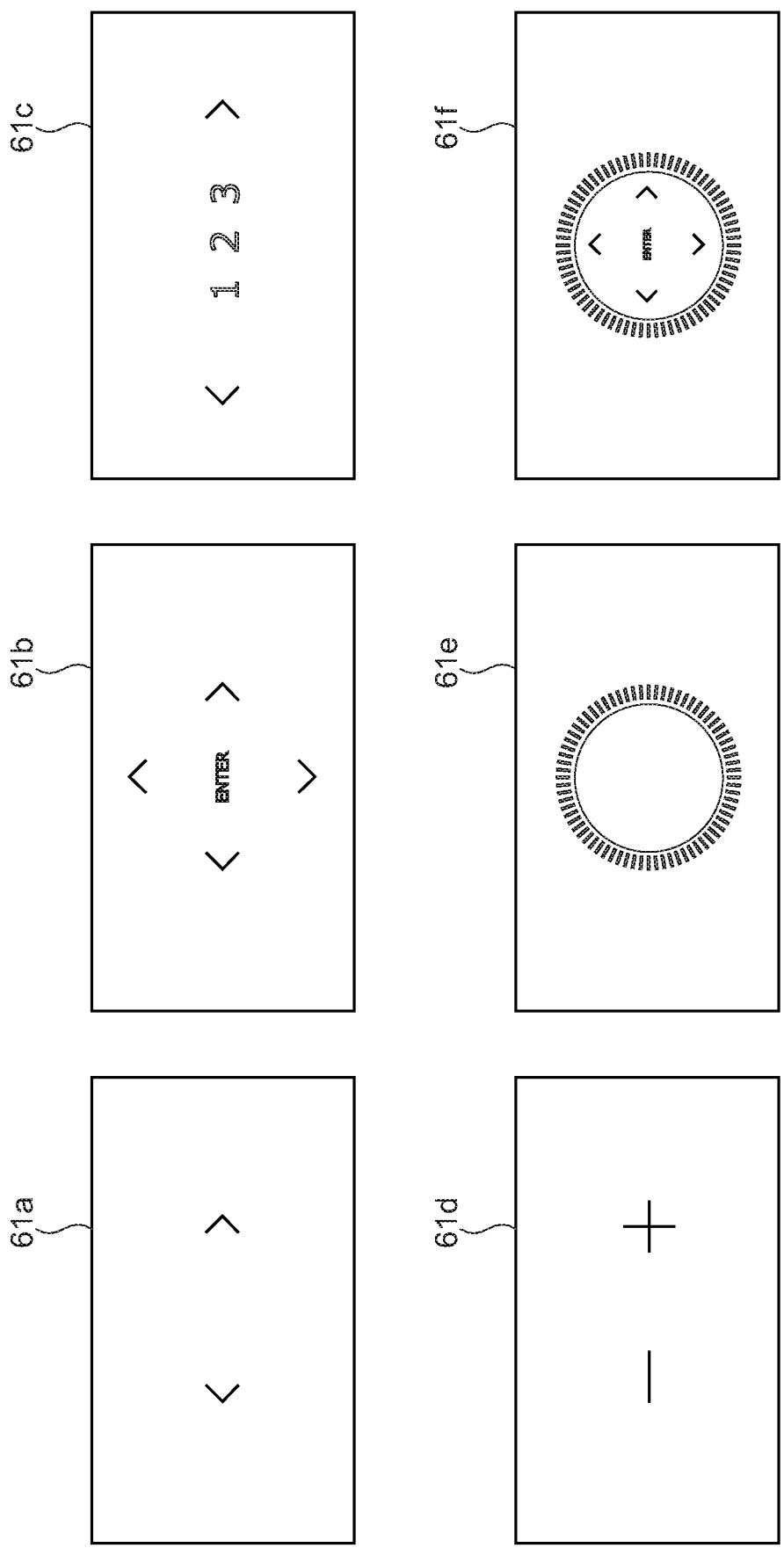
FIG. 21 is a schematic diagram illustrating examples of a display pattern of an operation image.

FIG. 21 is a schematic diagram illustrating display pattern examples of the operation image 60. FIG. 21 illustrates display patterns 61*a* to 61*f* of the operation image 60. For example, those display patterns 61*a* to 61*f* are appropriately projected around the user 1 in accordance with the posture of the user 1 by the projector of the operation input unit 34. Note that the rectangular outer frame is not displayed.

Right/left selection icons are displayed in the display pattern 61*a*. The display pattern 61*a* is displayed when an option illustrated in FIG. 13 is selected, for example. Four selection icons for the right, left, top, and bottom are displayed in the display pattern 61*b*. Further, at the center of the four selection icons, a determination icon for determining a selection is displayed by a text image (ENTER). In such a manner, the text image may be displayed as the operation image 60.

A selection icon displayed using a numerical text image is displayed in the display pattern 61*c*. This allows direct selection of the options. The numerical number or the like is not limited and, for example, selection icons representing the numbers of from 0 to 9 may be displayed. This allows input of numerical values.

Adjustment icons for adjusting values such as parameters are displayed in the display pattern 61*d*. For example, using adjustment icons displayed with minus (−) and plus (+) can easily adjust parameters such as the brightness and volume of video content.

A circular jog dial is displayed in the display pattern 61*e*. The user 1 can easily adjust values of parameters or the like by, for example, rotating a fingertip along the circumferential direction of the jog dial. In the display pattern 61*f*, the selection icons and the determination icon illustrated in the display pattern 61*b* are displayed inside of the circular jog dial. For example, such an operation image may be displayed.

Note that the display pattern of the operation image 60 is not limited to the display patterns 61*a* to 61*f* illustrated in FIG. 21. For example, any display pattern corresponding to the type of an operation input may be used as the operation image 60.

Hereinabove, the output control unit 105 according to this embodiment displays the main information 41 and the sub-information 42 having a type different from the main information 41 on the display target surface 13 disposed so as to cover the surrounding of the user 1 from the front toward the upper side. Those main information 41 and sub-information 42 having different types are controlled for the respective display locations on the basis of the posture information of the user 1. This makes it possible to exert high entertainment properties while improving the feeling of use of the user 1.

For example, it is conceivable that TV programs, movies, and the like are viewed using a display apparatus such as a display. The user gives attention to, for example, a location at which a display or the like is installed. This results in a possibility that the user takes an improper posture and the viewing of the display or the like may be a burden to the user.

In this embodiment, the main information 41 (main content) and the sub-information 42 (sub-content) are displayed on the display target surface 13 disposed so as to cover the front and the upper side of the user 1. The display locations of the main information 41 and the sub-information 42 are appropriately adjusted in accordance with the posture of the user 1.

This allows the user 1 to continue viewing necessary information without taking an improper posture even if the user 1 reclines the passenger seat 12 and the posture of the user 1 is changed. As a result, it becomes possible for the user 1 to continue viewing in an easy posture and possible to sufficiently improve the feeling of use (usability) of the user 1.

Further, the output control unit 105 can display the main information 41 in front of the user 1 and display the sub-information 42 in a location deviated from the center of the visual field 4 of the user 1. This allows easy check of the sub-content such as the notification information 54 (Notification) without hindering the reproduction display of the main content. As a result, it becomes possible to handle various types of information with no stress and to exert very high usability.

The relevant information 43 related to the main information 41 is displayed on the display target surface 13. This allows the main content to be displayed in an enlarged manner over the entire display target surface 13. As a result, for example, even if the user 1 moves the gaze from the main content, the user 1 has a feeling of being enclosed in an entertainment space, which makes it possible to avoid hindering a sense of immersion into a video. In such a manner, a viewing experience with high entertainment properties can be provided.

OTHER EMBODIMENTS

The present technology is not limited to the embodiment described above and can achieve other various embodiments.

In the embodiment described above, the sub-information is displayed in a location deviated from the center of the visual field of the user, but the present technology is not limited thereto. The sub-information may be displayed at the center of the visual field of the user. For example, in a case where an important notification or the like is received, notification information is displayed at the center of the visual field of the user. Such a process may be executed. Besides, the display location of the sub-information is not limited, and the display location may be controlled in accordance with, for example, the content of the sub-information.

In the embodiment described above, the output control unit installed in the vehicle executes the information processing method according to the present technology, the information processing method including display control over the display target surface or the like. However, the output control unit installed in the vehicle and another computer communicable via a network or the like may execute the information processing method and a program according to the present technology. Further, when the output control unit installed in the vehicle and another computer work in conjunction with each other, a content providing system according to the present technology may be established.

In other words, the information processing method and the program according to the present technology may be executed not only in a computer system configured by a single computer but also in a computer system in which a plurality of computers operates in conjunction with each other. Note that, in the present disclosure, the system means an aggregate of a plurality of components (such as apparatuses or modules (parts)) and it does not matter whether or not all the components are housed in the same casing. Therefore, a plurality of apparatuses housed in separate casings and connected to one another via a network, and a single apparatus having a plurality of modules housed in a single casing are both the system.

The execution of the information processing method and the program according to the present technology by the computer system includes, for example, both of the case where the acquisition of the posture information regarding the posture of a user, the control over the display locations of the main information and the sub-information on the display target surface, and the like are executed by a single computer and the case where those processes are executed by different computers. Further, the execution of the respective processes by a predetermined computer includes causing another computer to execute some or all of those processes and acquiring results thereof.

In other words, the information processing method and the program according to the present technology are also applicable to a cloud computing configuration in which one function is shared and cooperatively processed by a plurality of apparatuses via a network.

In the embodiments described above, the description has been given while using the vehicle as an example of the mobile object. However, the present technology is applicable to any type of mobile object and the like. The technology according to the present disclosure can be applied to various products. For example, the technology according to the present disclosure may be achieved as an apparatus installed in any kind of mobile object such as vehicles, electric vehicles, hybrid electric vehicles, personal transporters, airplanes, ships, construction machinery, agricultural machinery (tractors), and the like.

Further, the technology according to the present disclosure is not limited to be installed in a mobile object. For example, the present technology may be applied to a display system and the like used in amusement facilities and educational facilities. Further, a display system can also be established as a home entertainment system for home use. Besides, the present technology is applicable to any display system.

Out of the feature parts according to the present technology described above, at least two feature parts can be combined. That is, the various feature parts described in the respective embodiments may be arbitrarily combined irrespective of the embodiments. Further, various effects described above are merely examples and are not limited, and other effects may be exerted.

Note that the present technology may also be configured as below.

(1) An information processing apparatus, including:

an acquisition unit that acquires posture information regarding a posture of a user; and a display control unit that controls display locations of first information and second information on a display screen on the basis of the acquired posture information, the second information having a different kind from the first information, the display screen being disposed to cover a surrounding of the user at least from a front toward an upper side.

(2) The information processing apparatus according to (1), in which the first information includes at least one of video content selected by the user or a video of an outside.

(3) The information processing apparatus according to (1) or (2), in which the second information includes at least one of notification information to the user, menu information, or exterior environment information.

(4) The information processing apparatus according to any one of (1) to (3), in which the display control unit sets a display location of the first information, with the center of a visual field of the user as a reference.

(5) The information processing apparatus according to (4), in which
the display control unit sets a main display region in which the first information is to be displayed, with the center of the visual field of the user as a reference.
(6) The information processing apparatus according to (5), in which
the display control unit sets a display location of the second information, with the main display region as a reference.
(7) The information processing apparatus according to (5) or (6), in which
the display control unit is capable of displaying the second information in a periphery of the main display region.
(8) The information processing apparatus according to any one of (5) to (7), in which
the display control unit is capable of displaying the second information in a manner superimposed on the main display region.
(9) The information processing apparatus according to any one of (1) to (8), in which
the posture information includes at least one of a reclining angle of a seat to be used by the user or a user image obtained by capturing an image of the user.
(10) The information processing apparatus according to (9), in which
the posture information includes visual field information regarding a visual field of the user, the visual field being detected on the basis of the user image.
(11) The information processing apparatus according any one of (1) to (10), in which
the display control unit is capable of controlling display of third information having a different kind from each of the first information and the second information.
(12) The information processing apparatus according to (11), in which
the display control unit displays the third information in a region, of the display screen, other than a main display region in which the first information is to be displayed.
(13) The information processing apparatus according to (12), in which
the third information includes at least one of an extension image that extends a space represented by the first information displayed in the main display region or additional information regarding the first information.
(14) The information processing apparatus according to any one of (1) to (13), in which
the display control unit is capable of controlling a display location of an operation image for the user to perform an operation input.
(15) The information processing apparatus according to (14), in which
the display control unit sets an operation region, in which the operation image is to be displayed around the user, on the basis of the posture information.
(16) The information processing apparatus according to any one of (1) to (15), further including
a sound control unit that controls a sound output direction on the basis of the posture information.
(17) An information processing method to be executed by a computer system, the information processing method including:
acquiring posture information regarding a posture of a user; and
controlling display locations of first information and second information on a display screen on the basis of the acquired posture information, the second information having a different kind from the first information, the display screen being disposed to cover a surrounding of the user at least from a front toward an upper side.
(18) A program causing a computer system to execute the steps of:
acquiring posture information regarding a posture of a user; and
controlling display locations of first information and second information on a display screen on the basis of the acquired posture information, the second information having a different kind from the first information, the display screen being disposed to cover a surrounding of the user at least from a front toward an upper side.
(19) A display system, including:
a display apparatus;
a display screen disposed to cover a surrounding of a user at least from a front toward an upper side;
an acquisition unit that acquires posture information regarding a posture of the user; and
a display control unit that controls, on the basis of the acquired posture information, display locations of first information and second information having a different kind from the first information, the first information and the second information being to be displayed on the display screen by the display apparatus.
(20) A mobile object capable of transferring a user, the mobile object including:
a display apparatus;
a display screen disposed to cover a surrounding of a user at least from a front toward an upper side;
an acquisition unit that acquires posture information regarding a posture of the user; and
a display control unit that controls, on the basis of the acquired posture information, display locations of first information and second information having a different kind from the first information, the first information and the second information being to be displayed on the display screen by the display apparatus.

REFERENCE SIGNS LIST 1 user
4 visual field
5 center gaze direction
10 vehicle
12 passenger seat
13 display target surface
20 posture acquisition unit
21 display information control unit
22 operation input control unit
23 sound control unit
33 display apparatus
40 main display region
41 main information
42 sub-information
43 relevant information
45 extension image
50 vehicle body information
54 notification information 55 menu information
60 operation image
100 vehicle control system
105 output control unit

The invention claimed is:
1. An information processing apparatus, comprising:
circuitry configured to:
acquire posture information associated with a posture of a user;
determine a center of a visual field of the user based on the posture information;
set a main display region on a display surface of a specific object based on the center of the visual field of the user;
control, based on the set main display region on the display surface, a display location of first information to be displayed in the main display region and a display location of second information to be displayed in the main display region, wherein
the second information is different from the first information, and
the display surface covers a surrounding of the user at least from a front side of the user toward an upper side of the user;
set an operation region in a surface of the specific object based on the posture information, wherein the surface is different from the display surface;
control display of an operation image in the set operation region;
detect an operation input of the user on the operation image; and
change at least one of the first information or the second information based on the detected operation input on the operation image.

2. The information processing apparatus according to claim 1, wherein the first information includes at least one of video content associated with the user or a video of an outside of the information processing apparatus.

3. The information processing apparatus according to claim 1, wherein the second information includes at least one of notification information to the user, menu information, or exterior environment information.

4. The information processing apparatus according to claim 1, wherein the circuitry is further configured to display the second information in a periphery of the main display region.

5. The information processing apparatus according to claim 1, wherein the circuitry is further configured to superimpose the second information on the main display region.

6. The information processing apparatus according to claim 1, wherein
the circuitry is further configured to capture an image of the user,
the posture information includes at least one of the image of the user or a reclining angle of a seat of the specific object, and
the seat is associated with the user.

7. The information processing apparatus according to claim 6, wherein
the circuitry is further configured to detect the visual field of the user based on the image of the user, and
the posture information further includes visual field information associated with the visual field of the user.

8. The information processing apparatus according to claim 1, wherein the circuitry is further configured to control display of third information that is different from each of the first information and the second information.

9. The information processing apparatus according to claim 8, wherein
the circuitry is further configured to display the third information in a specific region of the display surface, and
the specific region is different from the main display region.

10. The information processing apparatus according to claim 9, wherein
the third information includes at least one of an extension image or additional information,
the additional information is associated with the first information,
the extension image corresponds to an image that extends a space associated with the first information, and
the circuitry is further configured to control display of the extension image in the main display region.

11. The information processing apparatus according to claim 1, wherein the circuitry is further configured to change a display location of the operation image based on a change of the posture of the user.

12. The information processing apparatus according to claim 1, the circuitry is further configured to control a sound output direction based on the posture information.

13. An information processing method, comprising:
acquiring posture information associated with a posture of a user;
determining a center of a visual field of the user based on the posture information;
setting a main display region on a display surface of a specific object based on the center of the visual field of the user;
controlling, based on the set main display region on the display surface, a display location of first information to be displayed in the main display region and a display location of second information to be displayed in the main display region, wherein
the second information is different from the first information, and
the display surface covers a surrounding of the user at least from a front side of the user toward an upper side of the user;
setting an operation region in a surface of the specific object based on the posture information, wherein the surface is different from the display surface;
controlling display of an operation image in the set operation region;
detecting an operation input of the user on the operation image; and
changing at least one of the first information or the second information based on the detected operation input on the operation image.

14. A non-transitory computer-readable medium having stored thereon computer executable instructions, which when executed by a computer system, cause the computer system to execute operations, the operations comprising:
acquiring posture information associated with a posture of a user;
determining a center of a visual field of the user based on the posture information;
setting a main display region on a display surface of a specific object based on the center of the visual field of the user;
controlling, based on the set main display region on the display surface, a display location of first information to be displayed in the main display region and a display location of second information to be displayed in the main display region, wherein
the second information is different from the first information, and
the display surface covers a surrounding of the user at least from a front side of the user toward an upper side of the user;
setting an operation region in a surface of the specific object based on the posture information, wherein the surface is different from the display surface;
controlling display of an operation image in the set operation region;
detecting an operation input of the user on the operation image; and
changing at least one of the first information or the second information based on the detected operation input on the operation image.

15. A display system, comprising:
a display apparatus;
a display surface configured to cover a surrounding of a user at least from a front side of the user toward an upper side of the user; and
circuitry configured to:
acquire posture information associated with a posture of the user;
determine a center of a visual field of the user based on the posture information;
set a main display region on the display surface based on the center of the visual field of the user;
control, based on the set main display region on the display surface, a display location of first information to be displayed in the main display region and a display location of second information to be displayed in the main display region, wherein
the second information is different from the first information, and
the display system is associated with a specific object;
set an operation region in a surface of the specific object based on the posture information, wherein the surface is different from the display surface;
control the display apparatus to display an operation image in the set operation region;
detect an operation input of the user on the operation image; and
change at least one of the first information or the second information based on the detected operation input on the operation image.

16. A mobile object, comprising:
a display apparatus;
a display surface configured to cover a surrounding of a user at least from a front side of the user toward an upper side of the user;
a surface different from the display surface; and
circuitry configured to:
acquire posture information associated with a posture of the user;
determine a center of a visual field of the user based on the posture information;
set a main display region on the display surface based on the center of the visual field of the user;
control, based on the set main display region on the display surface, a display location of first information to be displayed in the main display region and a display location of second information to be displayed in the main display region, wherein the second information is different from the first information;
set an operation region in the surface based on the posture information;
control the display apparatus to display an operation image in the set operation region;
detect an operation input of the user on the operation image; and
change at least one of the first information or the second information based on the detected operation input on the operation image.

17. The information processing apparatus according to claim 1, wherein
the posture information includes a reclining angle of a seat of the specific object, and
the circuitry is further configured to:
control a display size of each of the first information and the second information based on the reclining angle of the seat; and
set the operation region in the surface of the specific object based on the reclining angle of the seat.

* * * * *